United States Patent
Qi

(10) Patent No.: US 10,951,417 B2
(45) Date of Patent: Mar. 16, 2021

(54) BLOCKCHAIN-BASED TRANSACTION VERIFICATION

(71) Applicant: Advanced New Technologies Co., Ltd., Grand Cayman (KY)

(72) Inventor: Pengtao Qi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/779,201

(22) Filed: Jan. 31, 2020

(65) Prior Publication Data

US 2020/0228348 A1    Jul. 16, 2020

Related U.S. Application Data

(63) Continuation of application No. PCT/CN2020/071740, filed on Jan. 13, 2020.

(30) Foreign Application Priority Data

Jul. 12, 2019 (CN) .......................... 201910630854.0

(51) Int. Cl.
  *H04L 9/32* (2006.01)
  *H04L 9/30* (2006.01)
  *G06F 16/23* (2019.01)
(52) U.S. Cl.
  CPC ........ *H04L 9/3247* (2013.01); *G06F 16/2365* (2019.01); *H04L 9/30* (2013.01)
(58) Field of Classification Search
  CPC ..... H04L 9/30; H04L 9/3247; H04L 2209/38; H04L 9/3236; H04L 9/3239; H04L 9/0643; H04L 9/0637; G06F 16/2365
  See application file for complete search history.

(56) References Cited

U.S. PATENT DOCUMENTS 7,751,567 B2 * 7/2010 Quick, Jr. ............. H04L 9/3234
                                                                  380/264
10,725,803 B1 * 7/2020 Zhu ......................... G06F 9/455
(Continued)

FOREIGN PATENT DOCUMENTS

CN       105608588       5/2016
CN       106656974       5/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Linglan E Edwards
(74) *Attorney, Agent, or Firm* — Fish & Richardson P.C.

(57) ABSTRACT

This disclosure relates to blockchain-based transaction verification. Some aspects include receiving, by a blockchain system, transaction data to be verified. The transaction data includes plaintext transaction information and at least one piece of verifier signature data. The plaintext transaction information includes a designated-verifier information set that identifies verifiers that have been designated to verify the plaintext transaction information and that includes, for each of one or more verifiers, a piece of designated-verifier information. Each piece of signature data includes a digital signature generated by one of the verifiers. The blockchain system obtains an authenticated information set by verifying each digital signature. The authenticated information set includes the piece of designated-verifier information for each verifier for which the digital signature is successfully verified. The blockchain system determines that the transaction data is verified successfully when the authenticated
(Continued)

information set includes a pre-determined quantity of pieces of designated-verifier information.

14 Claims, 13 Drawing Sheets

(56) References Cited

U.S. PATENT DOCUMENTS

| | | | | |
|---|---|---|---|---|
| 2018/0068280 A1* | 3/2018 | Micali | ............... | G06Q 20/02 |
| 2019/0295050 A1* | 9/2019 | Chalkias | ............ | G06Q 20/3827 |
| 2020/0076571 A1* | 3/2020 | Natarajan | ........... | G06F 16/2246 |

FOREIGN PATENT DOCUMENTS

| | | |
|---|---|---|
| CN | 107330787 | 11/2017 |
| CN | 108023729 | 5/2018 |
| CN | 109067543 | 12/2018 |
| CN | 109165944 | 1/2019 |
| CN | 110458560 | 11/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/071740, dated Apr. 13, 2020, 20 pages. (with machine translation).

* cited by examiner

BLOCKCHAIN-BASED TRANSACTION VERIFICATION

CROSS-REFERENCE TO RELATED APPLICATIONS

This application is a continuation of PCT Application No. PCT/CN2020/071740, filed on Jan. 13, 2020, which claims priority to Chinese Patent Application No. 201910630854.0, filed on Jul. 12, 2019, and each application is hereby incorporated by reference in its entirety.

TECHNICAL FIELD

The present application relates the field of blockchain technologies, and in particular, to transaction verification.

BACKGROUND

Blockchain technology uses a linked data structure to verify and store data, uses a distributed node consensus algorithm to generate and update data, and uses a cryptographic method to ensure data transmission and access security. When the blockchain technology is used to process a transaction, a transaction initiated by a client can be executed only after the transaction is verified successfully, thereby ensuring transaction security.

SUMMARY

The present application provides a transaction verification method and device. With the method and device, a customized transaction verification process can be provided for each transaction, and data access amount can be reduced in the verification process.

According to an aspect of the present application, a transaction verification device is provided, including: receiving transaction data to be verified, where the transaction to be verified includes transaction information presented in plaintext and at least one piece of verifier signature data, the transaction information presented in plaintext includes a designated-verifier information set, the designated-verifier information set includes verifier information of at least one verifier designated to verify the transaction information presented in plaintext, and the verifier signature data includes a verifier signature; for the verifier signature in the at least one piece of verifier signature data, verifying the verifier signature in the verifier signature data based on the verifier signature data and the transaction information presented in plaintext, to obtain a verified-verifier information set; and determining that the data to be verified is verified successfully when the verified-verifier information set includes a pre-determined quantity of pieces of designated-verifier information in the designated-verifier information set.

Optionally, in an example, each designated verifier can have a respective designated-verifier weight, and determining that the data to be verified is verified successfully when the verified-verifier information set includes a pre-determined quantity of pieces of designated-verifier information in the designated-verifier information set includes: determining that the data to be verified is verified successfully when the verified-verifier information set includes a pre-determined quantity of pieces of designated-verifier information in the designated-verifier information set, and the sum of designated-verifier weights corresponding to the pre-determined quantity of pieces of designated-verifier information is not less than a first pre-determined value.

Optionally, in an example, each of the at least one designated verifier can have a respective public key weight, and determining that the data to be verified is verified successfully when the verified-verifier information set includes a pre-determined quantity of pieces of designated-verifier information in the designated-verifier information set includes: determining that the data to be verified is verified successfully when the verified-verifier information set includes a pre-determined quantity of pieces of designated-verifier information in the designated-verifier information set, and the sum of designated-verifier weights corresponding to the pre-determined quantity of pieces of designated-verifier information is not less than a second pre-determined value.

Optionally, in an example, the verifier signature data can further include a verifier public key, and verifying the verifier signature in the verifier signature data based on the verifier signature data and the transaction information presented in plaintext includes: decrypting the verifier signature in the verifier signature data by using the verifier public key in the verifier signature data, to obtain transaction information in the verifier signature; and determining that the verifier signature is verified successfully when the transaction information in the verifier signature is the same as the transaction information presented in plaintext.

Optionally, in an example, the designated-verifier information can include a designated-verifier public key, and the verified-verifier information set includes a verified-verifier public key set.

Optionally, in an example, the designated-verifier information can include a designated-verifier account, the verified-verifier information set includes a verified-verifier account set, and the method can further include: obtaining a corresponding designated-verifier public key in a blockchain system based on at least one designated-verifier account in the designated-verifier account set, to obtain a designated-verifier public key set; and determining that the data to be verified is verified successfully when the verified-verifier information set includes a pre-determined quantity of pieces of designated-verifier information in the designated-verifier information set includes: determining that the data to be verified is verified successfully when the verified-verifier public key set includes a pre-determined quantity of designated-verifier public keys.

Optionally, in an example, the verifier signature data can further include a verifier account, and verifying the verifier signature in the verifier signature data based on the verifier signature data and the transaction information presented in plaintext includes: decrypting the verifier signature in the verifier signature data by using the obtained verifier account, to obtain transaction information in the verifier signature; and determining that the verifier signature is verified successfully when the transaction information in the verifier signature is the same as the transaction information presented in plaintext.

Optionally, in an example, the designated-verifier information can include a designated-verifier public key, and the verified-verifier information set includes a verified-verifier public key set.

Optionally, in an example, the designated-verifier information can include a designated-verifier account, and the verified-verifier information set can include a verified-verifier account set.

Optionally, in an example, the data to be verified can further include transaction initiator signature data specific to the transaction information presented in plaintext, the transaction initiator signature data includes a transaction initiator signature, and the method further can further include: verifying the transaction initiator signature data based on the transaction information presented in plaintext and the transaction initiator signature data; and determining that the data to be verified is verified successfully when the verified-verifier information set includes a pre-determined quantity of pieces of designated-verifier information in the designated-verifier information set can include: determining that the data to be verified is verified successfully when the verified-verifier information set includes a pre-determined quantity of pieces of designated-verifier information in the designated-verifier information set, and the transaction initiator signature data is verified successfully.

Optionally, in an example, the transaction initiator signature data can further include a transaction initiator public key, and verifying the transaction initiator signature data based on the transaction information presented in plaintext and the transaction initiator signature data can include: decrypting the transaction initiator signature by using the transaction initiator public key in the transaction initiator signature data, to obtain transaction information in the transaction initiator signature; obtaining a transaction initiator public key in the blockchain system based on the transaction initiator account in the transaction information presented in plaintext; and determining that the transaction initiator signature data is verified successfully when the transaction information in the transaction initiator signature is the same as the transaction information presented in plaintext, and transaction initiator public key in the transaction initiator signature data is the same as the transaction initiator public key in the blockchain system.

Optionally, in an example, verifying the transaction initiator based on the transaction information presented in plaintext and the transaction initiator signature data includes: obtaining the transaction initiator public key in the blockchain system based on the transaction initiator account in the transaction information presented in plaintext; decrypting the transaction initiator signature by using the transaction initiator public key, to obtain transaction information in the transaction initiator signature; and determining that the transaction initiator signature is verified successfully when the transaction information in the transaction initiator signature is the same as the transaction information presented in plaintext.

According to another aspect of the present application, a transaction verification device is further provided, including: a unit for receiving transaction data to be verified, configured to receive the transaction data to be verified, where the transaction to be verified includes transaction information presented in plaintext and at least one piece of verifier signature data, the transaction information presented in plaintext includes a designated-verifier information set, the designated-verifier information set includes verifier information of at least one verifier designated to verify the transaction information presented in plaintext, and the verifier signature data includes a verifier signature; a verifier signature verification unit, configured to: for the verifier signature in the at least one piece of verifier signature data, verify the verifier signature in the verifier signature data based on the verifier signature data and the transaction information presented in plaintext, to obtain a verified-verifier information set; and a unit for verifying data to be verified, configured to determine that the data to be verified is verified successfully when the verified-verifier information set includes a pre-determined quantity of pieces of designated-verifier information in the designated-verifier information set.

Optionally, in an example, each designated verifier can have a respective designated-verifier weight, and the unit for verifying data to be verified can be configured to: determine that the data to be verified is verified successfully when the verified-verifier information set includes a pre-determined quantity of pieces of designated-verifier information in the designated-verifier information set, and the sum of designated-verifier weights corresponding to the pre-determined quantity of pieces of designated-verifier information is not less than a first pre-determined value.

Optionally, in an example, each designated verifier can have a respective designated-verifier weight, and the unit for verifying data to be verified can be configured to: determine that the data to be verified is verified successfully when the verified-verifier information set includes a pre-determined quantity of pieces of designated-verifier information in the designated-verifier information set, and the sum of designated-verifier weights corresponding to the pre-determined quantity of pieces of designated-verifier information is not less than a second pre-determined value.

Optionally, in an example, the verifier signature data can further include a verifier public key, and the verifier signature verification unit can include: a verifier signature decryption module, configured to decrypt the verifier signature in the verifier signature data by using the verifier public key in the verifier signature data, to obtain transaction information in the verifier signature; and a verifier signature verification module, configured to determine that the verifier signature is verified successfully when the transaction information in the verifier signature is the same as the transaction information presented in plaintext.

Optionally, in an example, the verifier information can include a designated-verifier account, the verified-verifier information set includes a verified-verifier account set, and the device can further include: a designated-verifier public key set acquisition unit, configured to obtain a corresponding designated-verifier public key in a blockchain system based on at least one designated-verifier account in the designated-verifier account set, to obtain a designated-verifier public key set; and the unit for verifying data to be verified is configured to: determine that the data to be verified is verified successfully when the verified-verifier public key set includes a pre-determined quantity of designated-verifier public keys.

Optionally, in an example, the verifier signature data can further include a verifier account, and the verifier signature verification unit can include: a verifier public key acquisition module, configured to obtain a verifier public key in the blockchain system based on the verifier account; a verifier signature decryption module, configured to decrypt the verifier signature in the verifier signature data by using the verifier public key in the verifier signature data, to obtain transaction information in the verifier signature; and a verifier signature verification module, configured to determine that the verifier signature is verified successfully when the transaction information in the verifier signature is the same as the transaction information presented in plaintext.

Optionally, in an example, the data to be verified can further include transaction initiator signature data specific to the transaction information presented in plaintext, the transaction initiator signature data includes a transaction initiator signature, and the device can further include: a transaction initiator signature data verification unit, configured to verify the transaction initiator signature data based on the transaction information presented in plaintext and the transaction initiator signature data; and the unit for verifying data to be verified is configured to: determine that the data to be verified is verified successfully when the verified-verifier information set includes a pre-determined quantity of pieces of designated-verifier information in the designated-verifier information set, and the transaction initiator signature data is verified successfully.

Optionally, in an example, the transaction initiator signature data can further include a transaction initiator public key, and the transaction initiator signature data verification unit can include: a transaction initiator signature decryption module, configured to decrypt the transaction initiator signature by using the transaction initiator public key in the transaction initiator signature data, to obtain transaction information in the transaction initiator signature; a public key acquisition module, configured to obtain a transaction initiator public key in the blockchain system based on the transaction initiator account in the transaction information presented in plaintext; and a transaction initiator signature verification module, configured to determine that the transaction initiator signature data is verified successfully when the transaction information in the transaction initiator signature is the same as the transaction information presented in plaintext, and transaction initiator public key in the transaction initiator signature data is the same as the transaction initiator public key in the blockchain system.

Optionally, in an example, the transaction initiator signature data verification unit can include: a public key acquisition module, configured to obtain a transaction initiator public key in the blockchain system based on the transaction initiator account in the transaction information presented in plaintext; a transaction initiator signature decryption module, configured to decrypt the transaction initiator signature by using the transaction initiator public key in the transaction initiator signature data, to obtain transaction information in the transaction initiator signature; and a transaction initiator signature verification module, configured to determine that the transaction initiator signature is verified successfully when the transaction information in the transaction initiator signature is the same as the transaction information presented in plaintext.

According to another aspect of the present application, a computing device is further provided, including: at least one processor; and a storage device, where the storage device stores an instruction, and when the instruction is executed by the at least one processor, the at least one processor is enabled to perform the method described above.

According to another aspect of the present application, a non-transitory machine readable storage medium is further provided, where the medium stores a computer program, and when the computer program is executed by a machine, the machine is enabled to perform the method described above With the method and device according to the present application, a designated verifier is designated to verify a transaction, and after the at least one verifier signature in the data to be verified is verified, it is determined that the data to be verified is verified successfully when the verified-verifiers include a pre-determined quantity of designated verifiers. As such, a transaction verifier can be designated based on a property of the transaction, to provide a customized transaction verification process for the transaction. In addition, data access amount is reduced in the verification process.

With the method and device according to the present application, each designated verifier is assigned a designated-verifier weight, and it is determined that the data to be verified is verified successfully when the verified-verifiers include a pre-determined quantity of designated verifiers, and the sum of designated-verifier weights of the pre-determined quantity of designated verifiers reaches the first pre-determined value, thereby further improving transaction security.

With the method and device according to the present application, each designated verifier is assigned a public key weight, and it is determined that the data to be verified is verified successfully when the verified-verifier information set includes a pre-determined quantity of designated-verifier public keys, and the sum of designated-verifier public key weights corresponding to the pre-determined quantity of designated public keys is not less than a second pre-determined value, thereby further improving transaction security.

With the method and device according to the present application, the transaction data to be verified includes a designated-verifier public key set, and the verified-verifier public keys and the designated-verifier public key set are analyzed to determine whether the verified verifiers include a pre-determined quantity of designated verifiers, thereby simplifying the verification process.

With the method and device according to the present application, the transaction initiator is verified, and it is determined that the data to be verified is verified successfully when the transaction initiator is verified successfully and the information set of the successfully verified verifiers include a pre-determined quantity of pieces of designated-verifier information. As such, when it is determined that the transaction initiator is an authorized initiator, it is determined that the transaction data to be verified is verified successfully, thereby improving transaction security.

BRIEF DESCRIPTION OF DRAWINGS

The nature and advantages of the present application can be better understood with reference to the following accompanying drawings. In the accompanying drawings, identical components or features can have the same reference sign. The accompanying drawings allow for further understanding of the implementations of the present application and constitute a part of the present specification. The accompanying drawings are used to describe the implementations of the present application together with the following specific implementations, but do not constitute a limitation on the implementations of the present application. In the accompanying drawings.

DESCRIPTION OF IMPLEMENTATIONS

Figure 1:
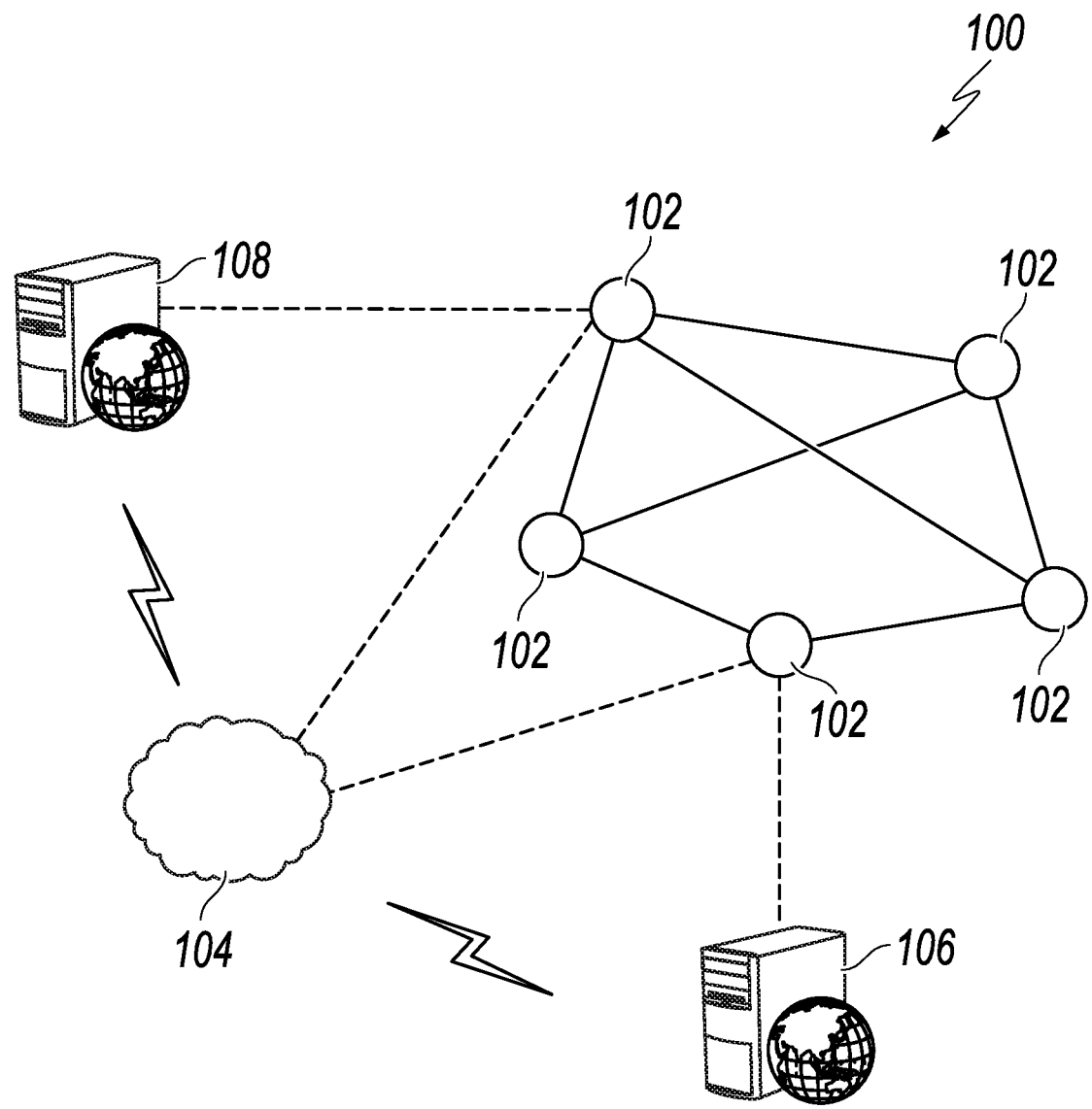
FIG. 1 is a schematic diagram illustrating an example environment for performing a transaction verification method, according to the present application.

The following describes the subject of the present specification with reference to example implementations. It should be understood that these implementations are merely intended to enable a person skilled in the art to better understand the subject of the present specification, and but not limit the protection scope or applicability of the claims. Functions and arrangements of the described elements can be modified without departing from the protection scope of the present application. Various processes or components can be omitted, replaced, or added in the examples as required. In addition, features described relative to some examples can be combined in other examples.

As used here, the terms "include" and "comprise" and their variants means "including but not limited to". The term "based on" means "at least partially based on". The term "an implementation" means "at least one implementation". The term "another implementation" means "at least one of other implementations". The terms such as "first" and "second" can indicate different or identical objects. Other explicit and implicit definitions can be included below. The definition of a term is consistent throughout the present specification, unless the context clearly indicates otherwise.

The following describes a transaction verification method and device according to the present application with reference to the accompanying drawings.

A blockchain is a linked data structure that is obtained by combining data blocks in chronological order and uses a cryptographic method to prevent the data blocks from being tampered and faked. A blockchain includes one or more blocks. Each block in the blockchain is linked to a preceding block in the blockchain by using the cryptographic hash that includes the preceding block. Each block further includes a timestamp, a cryptographic hash of the block, and one or more transactions. A Merkle tree is formed by hashing transactions that are already verified by the nodes in the blockchain network. In the Merkle tree, data of each leaf node is hashed; and for each branch of the Merkle tree, all hash values of the branch are concatenated at the root of the branch. The foregoing processing is performed on the Merkle until the root node of the entire Merkle is processed. The root node of the Merkle tree stores all hash values that represent all data in the Merkle tree. When it is declared that a hash value is a transaction stored in the Merkle tree, quick verification can be performed by determining whether the hash value is consistent with the structure of the Merkle tree.

A blockchain is a data structure for storing transactions. A blockchain network is a computing node network for managing, updating, and maintaining one or more blockchain structures. Blockchain networks include a public blockchain network, a private blockchain network, and a consortium blockchain network.

In a public blockchain network, the consensus process is controlled by nodes in a consensus network. For example, in a public blockchain network, thousands of entities can perform collaborative processing, and each entity processes at least one node in the public blockchain network. Therefore, the public blockchain network can be considered as a public network of participating entities. In some examples, most entities (nodes) need to sequentially add signatures on all blocks, and add the blocks with the signatures to blockchains in the blockchain network. An example of the public blockchain network is a specific peer-to-peer payment network. The term "blockchain" used here does not represent any specific blockchain.

The public blockchain network supports public transactions. A public transaction is shared among all nodes in the public blockchain network and stored in a global blockchain. The global blockchain is a blockchain that can perform copying across all nodes. To reach a consensus (for example, agreeing to add a block to the blockchain), a consensus protocol is implemented in the public blockchain network. Examples of the consensus protocol include but are not limited to proof-of-work (POW), proof-of-stake (POS), and proof-of-authority (POA). In the present application, POW is used as a non-limiting example.

A private blockchain network is used to serve a specific entity. The read permission and write permission of each node in the private blockchain network are strictly controlled. Therefore, the private blockchain network is usually called a grant-based network, which limits the participants of the network and the participation levels of the participants (for example, only in some transaction scenarios). In the private blockchain network, various access control mechanisms can be used (for example, existing participants vote on adding an entity, or controlling permissions by a monitoring organization).

A consortium blockchain network is private among network participants. In a consortium blockchain network, the consensus process is controlled by authorized nodes. For example, a consortium formed by several entities (for example, 10 financial institutions or insurance companies) can operate the consortium blockchain network, and each entity operates at least one node in the consortium block network. Therefore, the consortium blockchain network can be considered as a private network of participating entities.

In some examples, all participating entities (nodes) need to sequentially add signatures on all blocks, and add the blocks with the signatures to blockchains in the blockchain network. In some examples, a subset of the participating entities (nodes) (for example, at least seven entities) needs to add signatures on all blocks, and add the blocks with the signatures to blockchains in the blockchain network.

In the present application, implementations of the present application are described in detail with reference to the consortium blockchain network. However, it can be anticipated that the implementations of the present application can be implemented in any suitable blockchain network.

A blockchain is a tamper-proofing shared digital ledger, and is used to record transactions in a public or private peer-to-peer network. The ledger is distributed to all member nodes in the network, and historical asset transactions that have happened in the network are permanently recorded in blocks.

A consensus mechanism ensures all network nodes in a distributed blockchain network execute transactions in a same order and write the transactions into a same ledger. A consensus model is intended to resolve the Byzantine problem. In the Byzantine problem, for example, a component (for example, a server or a node) in a distributed blockchain network may fail or intentionally transmit error information to other nodes. Because other nodes first need to reach a consensus on which network node first fail, it is difficult for other nodes to declare that the component has failed and remove the component from the blockchain network.

FIG. 1 is a schematic diagram illustrating an example environment 100 for performing a transaction verification method, according to the present application. In some examples, the environment 100 enables entities to participate in a blockchain network 102. As shown in FIG. 1, the environment 100 includes a network 104 and computing devices/systems 106 and 108. In some examples, the network 104 can include a local area network (LAN), a wide area network (WAN), the Internet, or a combination thereof, and is connected to a website, a user device (for example, computing devices), and a back-end system. In some examples, the network 104 can be accessed by using a wired communications link and or a wireless communications link. In some examples, the computing devices/systems 106 and 108 communicate with each other through the network 104, and communicate with the blockchain network 102 through the network 104; and nodes (or node devices) in the blockchain network 102 communicate with each other through the network 104. Generally, the network 104 represents one or more communications networks. In some cases, the computing devices/systems 106 and 108 can be nodes in a cloud computing system (not shown); or each of the computing devices/systems 106 and 108 is an independent cloud computing system, which includes a plurality of computers interconnected through the network 104 and is used as a distributed processing system.

In the described examples, each of the computing devices/systems 106 and 108 can include any suitable computing system that can participate in the blockchain network 102 as a node of the blockchain network 102. Examples of the computing device/system include but are not limited to a server, a desktop computer, a note computer, a tablet computer, and a smartphone. In some examples, one or more computer-implementable services used for interaction with the blockchain block 102 can be installed on each of the computing devices/systems 106 and 108. For example, a service of a first entity (for example, user A) can be installed on the computing device/system 106, for example, a service that is used by the first entity to manage transactions between the first entity and one or more of other entities (for example, other users). For example, a service of a second entity (for example, user B) can be installed on the computing device/system 108, for example, a service that is used by the second entity to manage transactions between the second entity and one or more of other entities (for example, other users). In the example shown in FIG. 1, the blockchain network 102 is a peer-to-peer network, and the computing system/device 106 and the computing system/device 108 respectively serve as the nodes of the first entity and the second entity that participate in the blockchain network 102.

Figure 2:
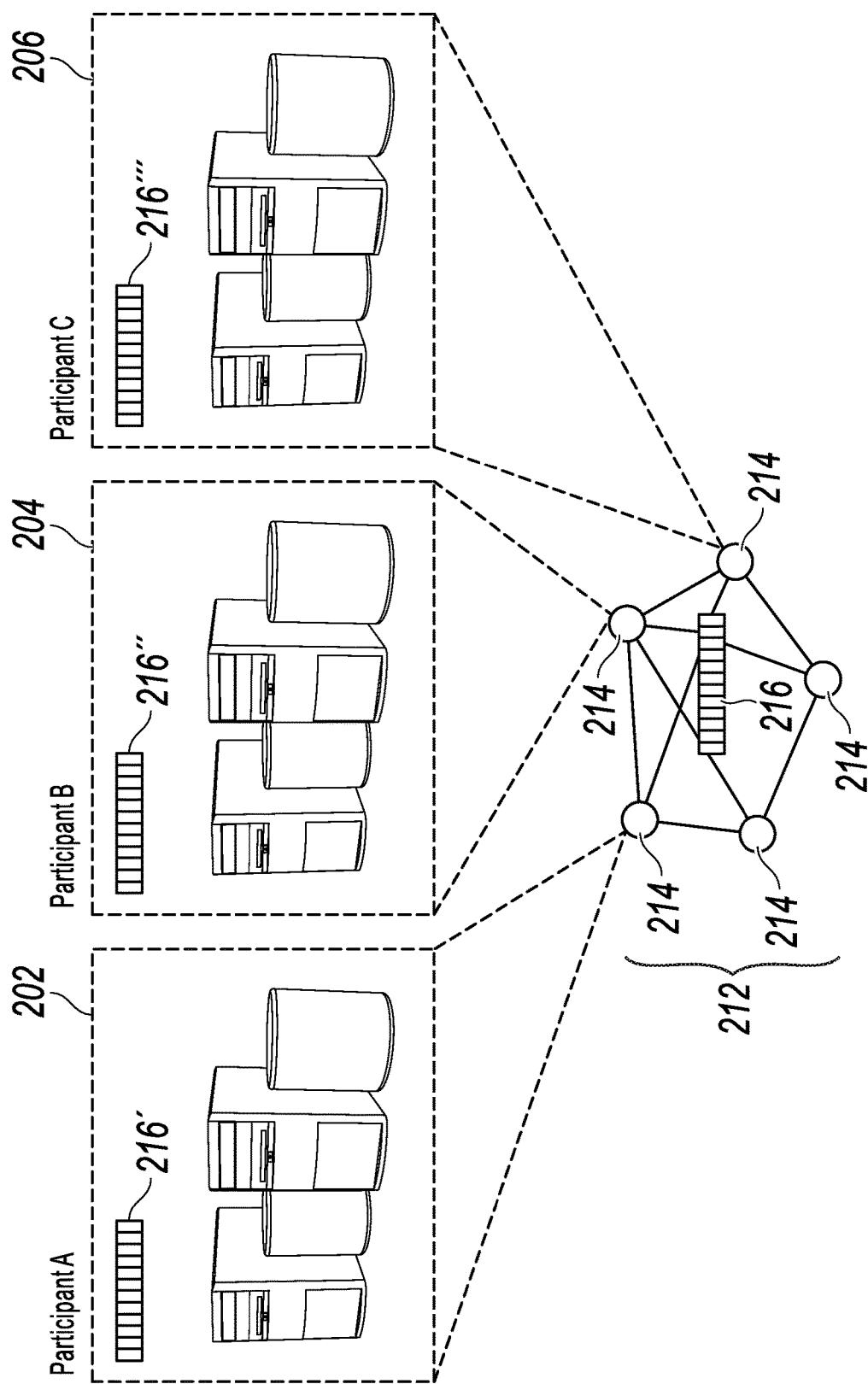
FIG. 2 is a schematic diagram illustrating an example system architecture for performing a transaction verification method, according to the present application.

FIG. 2 is a schematic diagram illustrating an example system architecture 200 for performing a transaction verification method, according to the present application. The example system architecture 200 includes participant systems 202, 204, and 206 that respectively corresponding to participant A, participant B, and participant C. Each participant (for example, a user or an enterprise) participates in a blockchain network 212 that is used as a peer-to-peer network. The blockchain network 212 includes a plurality of nodes 214, and at least some of the nodes 214 record information in a blockchain 216, and the recorded information cannot be changed. Although a single blockchain 216 is shown in the blockchain network 212, a plurality of copies of the blockchain 216 can be provided, and the plurality of copies of the blockchain 216 are maintained in the blockchain network 212. Details are provided later.

In the shown example, participant systems 202, 204, and 206 are respectively provided by participant A, participant B, and participant C, or are provided as participant A, participant B, and participant, and serve as corresponding nodes 214 in the blockchain network 212. As used here, a node usually refers to a single system (for example, a computer or a server) connected to the blockchain network 212, and enables a corresponding participant to participant in the blockchain network. In the example shown in FIG. 2, participants corresponding to all nodes 214. However, one participant can operate a plurality of nodes 214 in the blockchain network 212, and/or a plurality of participants share one node 214. In some examples, participants 202, 204, and 206 communicate with the blockchain network 212 by using a protocol (for example, Hypertext Transfer Protocol Secure (HTTPS) and/or a remote procedure call, or communicate with each other through the blockchain network 212.

Nodes 214 can have different levels of participating in the blockchain network 212. For example, some nodes 214 can participate in the consensus process (for example, serving as miner nodes that add blocks to the blockchain 216), while other nodes 214 do not participate in the consensus process. In another example, some nodes 214 store complete copies of the blockchain 216, while other nodes 214 store only some copies of the blockchain 216. In the example shown in FIG. 2, participant systems 202, 204, and 206 respectively store complete copies 216', 216'', and 216''' of the blockchain 216.

A blockchain (for example, the blockchain 216 in FIG. 2) include a string of blocks, and each block stores data. An example of data can be transaction data related to a transaction between two or more participants. In the present application, a transaction is used as anon-limiting example. It can be anticipated that any suitable data (for example, a document, an image, a video, or audio) can be stored in a blockchain. Examples of the transaction can include but are not limited to exchange of valuable objects (for example, assets, products, services, or currencies). Transaction data is stored in the blockchain and cannot be changed.

The transaction data is hashed before stored in the blockchain. Hashing is a process in which transaction data (which is provided as character string data) is converted to a hash value of a fixed length. After the transaction data is hashed, a different hash value will be obtained even when a minor change is made to the transaction data. A hash value is usually generated by hashing transaction data by using a hash function. An example of the hash function include but is not limited to Secure Hash Algorithm 256 (SHA-256), which outputs a 256-bit hash value.

Transaction data of a plurality of transactions is hashed and stored in blocks. For example, the data of two transactions is hashed to obtain two hash values, and then the two obtained hash values are hashed to obtain another hash value. This process is repeated until a single hash value is obtained for all transactions that need to be stored in blocks. The hash value is called the Merkle root hash value and stored in the head of a block. A change to any transaction will change hash values and finally change the Merkle root hash value.

Blocks are added to a blockchain by using a consensus protocol. A plurality of participating nodes in the blockchain network participate in the consensus protocol, and contend to add blocks to the blockchain. Such a node is called a miner node (or a ledger node). The POW described above is used as an example.

Miner nodes perform a consensus process to add a transaction (a corresponding block) to a blockchain. Although a plurality of miner nodes participate in the consensus process, only one node can write the block to the blockchain. That is, during the consensus process, the miner nodes contend to add their blocks to the blockchain. Specifically, the miner nodes periodically collect transactions to be processed from a transaction pool (for example, until a pre-determined threshold (for the quantity of transactions that can be included in the blockchain is reached, if any). The transaction pool includes transaction messages from the participants in the blockchain network. A miner node creates a block, and adds a transaction to the block. Before adding the transaction to the block, the miner node checks whether the transaction to be added is already stored in another block in the blockchain. If the transaction to be added is already stored in another block, the transaction is discarded.

A miner node generates a block head, hashes all transactions in the block, and combines hash values in pairs to generate further hash values until a single hash value (Merkle root hash value) is obtained for all the transactions in the block. Then, the Merkle root hash value is added to the block head. The miner node also determines the hash value of a latest block in the blockchain (that is, the last block added to the blockchain). The miner node can also add a nonce value and a timestamp to the block head. In the mining process, the miner node attempts to find a hash value that meets required parameters. The miner node constantly changes the nonce value until the hash value that meet the required parameters is found.

Each miner node in the blockchain network contend to find a hash value that meets the required parameters. Finally, one miner node finds the hash value that meets the required parameters, and advertise the hash value to all other miner nodes in the blockchain network. Other miner nodes verify the hash value. If the hash value is correct, other nodes verify each transaction in the blockchain, accepts the block, and appends the block to their blockchain copies. As such, all miner nodes in the blockchain network reach a consensus on the global status of the blockchain. The foregoing process is specific to the POW consensus protocol.

In the example provided in FIG. 2, participant A needs to send a certain amount of money to participant B. Participant A generates a transaction message, and sends the transaction message to the blockchain network. Then the transaction message is added to a transaction pool. Each miner node in the blockchain network creates a block, obtains a transaction from the transaction pool, and adds the transaction to the block. As such, the transaction published by participant A is added to a block of the miner node.

In some blockchain networks, a cryptographic technology is implemented to protect privacy of the transaction. For example, if two nodes need to protect transaction privacy so that other nodes in the blockchain network cannot know transaction details, the nodes can encrypt the transaction data. Examples of the encryption method include but are not limited to symmetrical encryption and asymmetrical encryption. Symmetrical encryption means that a single key is used for encryption (generating plaintext based on ciphertext) and decryption (generating ciphertext based on plaintext). In symmetrical encryption, a plurality of nodes can use the same key, and therefore each node can encrypt/decrypt the transaction data.

Symmetrical encryption means that a key pair is used for encryption. Each key pair includes a private key and a public key. The private key is known to a corresponding node, and the public key is known to any node or all other nodes in the blockchain network. A node can use a public key of another node to encrypt data, and can use a private key of another node to decrypt encrypted data. For example, refer to FIG. 1 again. Participate A can use a public key of participant B to encrypt data, and send the encrypted data to participant B. Participant B can use a private key of participant B to decrypt the encrypted data (ciphertext) to extract original data (plaintext). A message that is encrypted by using a public key of a node can be decrypted by using only a private key of the node.

Asymmetric encryption is used to provide a digital signature, so that a participant in a transaction can determine other participants in the transaction and verify validity of the transaction. For example, a node can add a digital signature on a message, and another node can determine, based on the digital signature of participant A, that the message is sent by the node. A digital signature can be further used to ensure that a message is not tampered with during transmission. For example, refer to FIG. 1 again. Participant A sends a message to participant B. Participant A generates a hash value of the message, and uses a private key of participant A to encrypt the hash value to generate a digital signature. Participant A appends the digital signature to the message, and sends the message with the digital signature to participant B. Participant B uses a public key of participant A to decrypt the digital signature to obtain the corresponding hash value. Participant B hashes the received message to obtain another hash value, and then compares the two hash values. If the two hash values are the same, participant determines that the message is received from participant A and is not tampered with.

Figure 3:
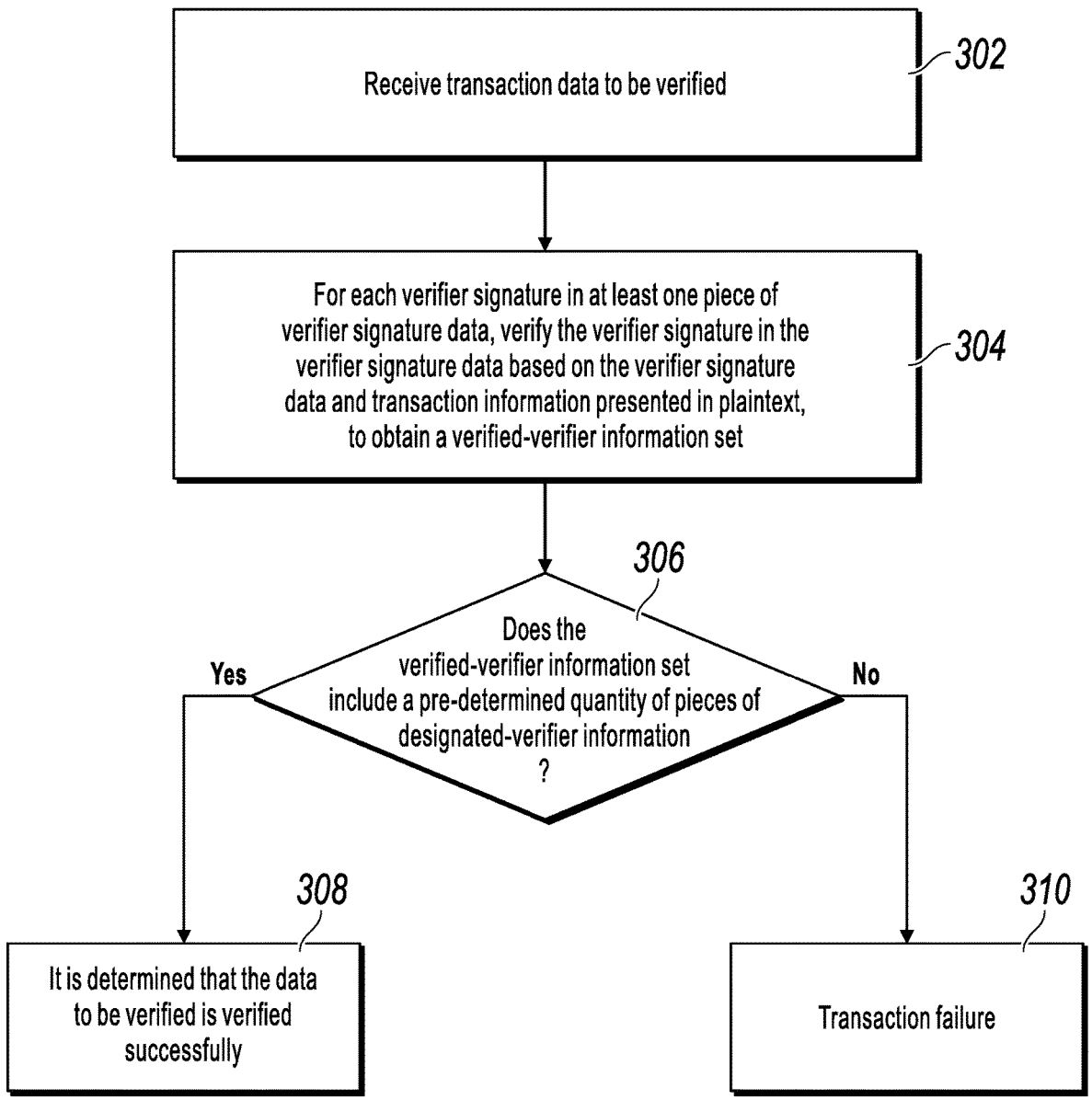
FIG. 3 is a flowchart illustrating a transaction verification method, according to an implementation of the present application.

FIG. 3 is a flowchart illustrating a transaction verification method, according to an implementation of the present application.

As shown in FIG. 3, at block 302, data to be verified is received. The data to be verified includes transaction information presented in plaintext and at least one piece of verifier signature data, and the transaction information presented in plaintext includes a designated-verifier information set. The transaction information presented in plaintext refers to transaction information that is not encrypted. If the transaction information presented in plaintext is not tampered with or no information is lost, substantial content of the transaction information presented in plaintext is the same as the transaction information.

When the transaction involves a plurality of affiliated transaction parties, each transaction involves a transaction initiator and a verifier of the transaction. For example, the conformer can verify whether the transaction is authorized, whether to allow the transaction to proceed, etc. Transaction parties can negotiate a transaction verification rule, and verify a transaction based on the transaction verification rule when the transaction is performed. For each transaction, transaction parties other than the initiator of the transaction can be considered as verifiers, and a verifier that is designated to verify the transaction is a designated verifier. The designated verifier of each transaction can be designated by the transaction initiator. Alternatively, the designated verifier can be determined based on a rule negotiated by affiliated transaction parties of the transaction or based on a designated list. Each transaction may have one or more designated verifiers. The quantity of designated verifiers can be determined based on service scenarios.

When the transaction initiator initiates a transaction, after adding a digital signature, the transaction initiator can send the transaction to each designated verifier, so that the designated verifier can add a digital signature. After the signature data of the transaction initiator and the signature data of each verifier are received, the transaction data to be verified can be generated and sent to the blockchain system for verification of the transaction. For example, the blockchain system can the system shown in FIG. 1 and FIG. 2.

Figure 4:
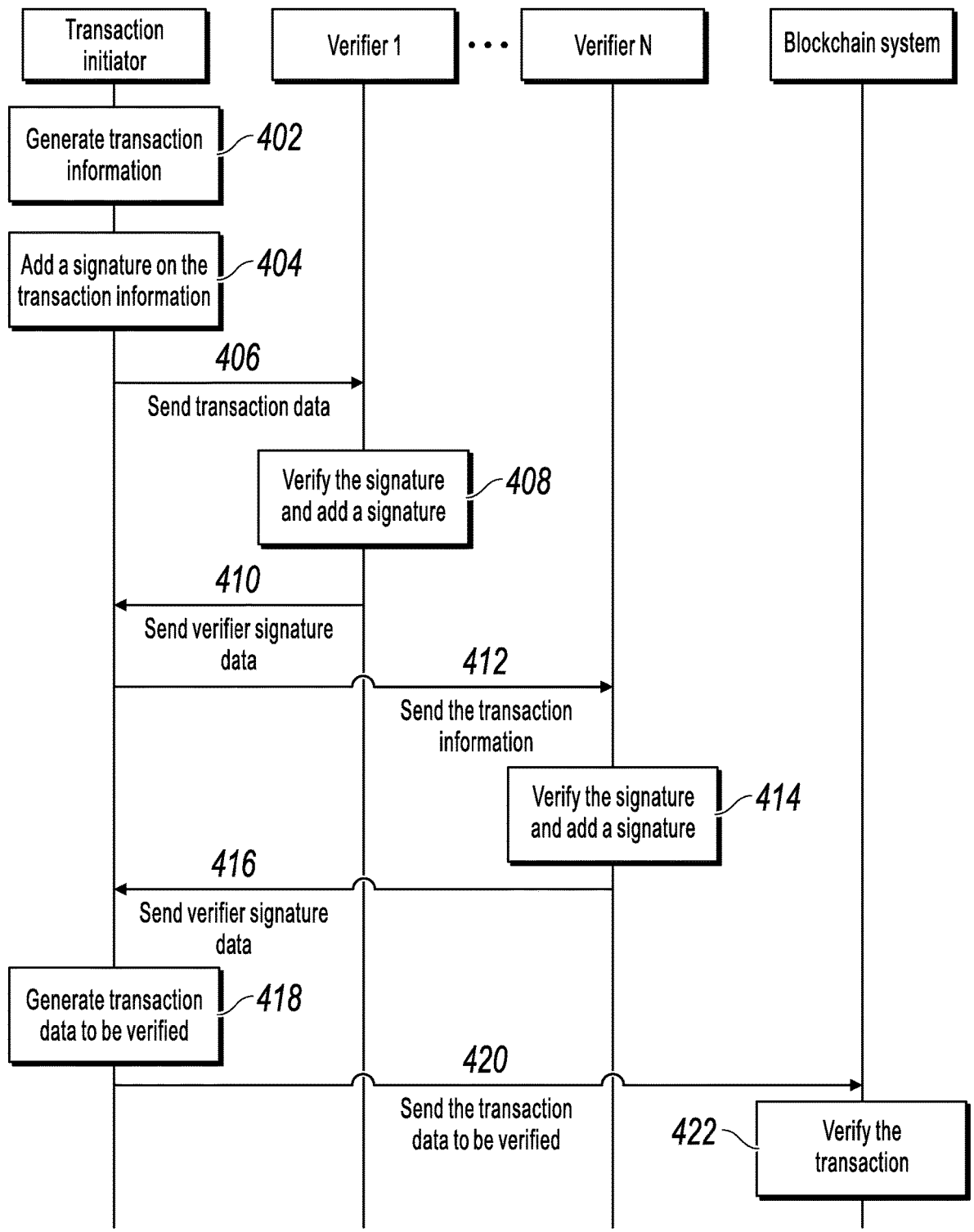
FIG. 4 is flowchart illustrating an example process of generating data to be verified in a transaction verification method, according to an implementation of the present application.

FIG. 4 is flowchart illustrating an example process of generating data to be verified in a transaction verification method, according to an implementation of the present application.

As shown in FIG. 4, at block 402, a transaction initiator generates transaction information when initiating a transaction. For example, the transaction information can include a transaction initiator account, a transaction object account, a transaction amount, a transaction summary, a timestamp, etc. The transaction information can further include a designated-verifier information set. The designated-verifier information set includes designated-verifier information of at least one designated verifiers that are designated to verify the transaction. For example, the designated-verifier information can be a designated-verifier public key or a designated-verifier account.

After the transaction information is generated, at block 404, the transaction initiator adds a digital signature on the transaction information by using a private key of the transaction initiator, to obtain a signature of the transaction initiator. Then, in the transaction sending processes such as block 406 and block 412, the transaction information (including transaction information presented in plaintext and transaction initiator signature data) is sent to each verifier. The transaction initiator signature data can include a transaction initiator public key and a transaction initiator signature.

In an example, the transaction initiator can send the transaction information presented in plaintext and the transaction initiator signature data to only the designated verifier. In another example, the transaction initiator can send the transaction information presented in plaintext and the transaction initiator signature to all verifiers. After receiving the data, each verifier can determine, based on the designated-verifier information set in the transaction information presented in plaintext, whether the verifier is the designated verifier of the corresponding transaction.

In the processes such as block 408 and block 414, after verifying that the transaction initiator signature is authorized, each verifier can verify the received transaction data, and add a digital signature on the transaction information presented in plaintext after the transaction information presented in plaintext is verified successfully, to obtain the verifier signature data. The designated verifier can verify the transaction initiator signature by using the public key in the transaction initiator signature data. Specifically, the transaction initiator signature can be decrypted by using the transaction initiator public key, to obtain the transaction information in the transaction initiator signature. When the transaction obtained through decryption is the same as the transaction information presented in plaintext, it is determined that the transaction data is received from an authorized transaction initiator. In an example, when the information network environment is secure, the transaction data sent to each verifier or a designated verifier may not include the transaction initiator signature data. In this example, each designated verifier does not need to verify the transaction initiator signature. In an example, each verifier can verify the signature and add a signature when determining that the verifier is a designated verifier of the corresponding transaction. In an example, each verifier can verify the signature of and add a signature on all the received transaction data, or determine whether to verify the signature of and add a signature on all the received transaction data based on a rule of the verifier.

After the verifier signature data is obtained, in the processes such as block 410 and block 416, each verifier sends the verifier signature data to the transaction initiator. Then, at block 418, the transaction initiator generates the transaction data to be verified, and at block 420, sends the transaction data to be verified to the blockchain system. After the blockchain system receives the transaction data to be verified, at block 422, the blockchain system verifies the transaction data to be verified.

The verifier signature data may include only the designated-verifier signature data. A verifier that is not a designated verifier may also add a signature on the received transaction data. Now, the verifier signature data in the transaction data to be verified that is sent to the blockchain system includes the designated-verifier signature data and undesignated-verifier signature data.

In an example, the transaction data to be verified can be in the following data format: [Payload, [PubA, SignA], [PubB, signB], [PubC, signC]. "Payload" represents transaction information presented in plaintext, and its data format can be [XX, XX, XX, [PubB, PubC]]. "PubA" is a transaction initiator signature; "PubB" and "PubC" are respectively a signature of designated verifier B and a signature of designated verifier C; "[PubB, PubC]" is a designated-verifier information set.

After the transaction data to be verified is received, at block 304, for a verifier signature in each of the at least one piece of verifier signature data, the verifier signature in the verifier signature data is verified based on the verifier signature data and the transaction information presented in plaintext, to obtain a verified-verifier information set. The verified-verifier information set includes verifier information of each verifier whose verifier signature is verified as authorized. The verification process of the verifier signature is described below with reference to FIG. 8 and FIG. 9.

When the verified-verifier information set is received, at block 306, it is determined whether the verified-verifier information set includes a pre-determined quantity of pieces of designated-verifier information in the designated-verifier information set. When it is determined that the verified-verifier information set includes a pre-determined quantity of pieces of designated-verifier information in the designated-verifier information set, at block 308, it is determined that the data to be verified is verified successfully; otherwise, at block 310, it is determined that the corresponding transaction is unauthorized, and the transaction fails.

In an example, when the verified-verifier information set includes a pre-determined quantity of pieces of designated-verifier information in the designated-verifier information set, it can be determined that the data to be verified is verified successfully. In an example, the condition for successful verification is that all designated verifiers have added a signature on the transaction information presented in plaintext, and all the signatures of the designated verifiers are verified as authorized. In another example, the affiliated parties can negotiate a rule for successful verification. That is, when most of the designated verifiers add a signature on the transaction information presented in plaintext, and all the signatures of the designated verifiers are verified as authorized, it is determined that transaction data to be verified is verified successfully (that is, the corresponding transaction is accepted by most of the designated verifiers).

In an example, each designated verifier information can have a respective designated-verifier weight. When it is determined that the verified-verifier information set includes a pre-determined quantity of pieces of designated-verifier information in the designated-verifier information set, it can be further determined whether the sum of designated-verifier weights corresponding to the pre-determined quantity of pieces of designated-verifier information is not less than a first pre-determined value. If the sum of designated-verifier weights corresponding to the pre-determined quantity of pieces of designated-verifier information is not less than a first pre-determined value, it is determined that the data to be verified is verified successfully. If the sum of designated-verifier weights corresponding to the pre-determined quantity of pieces of designated-verifier information is 100, it is determined that the transaction data to be verified is verified successfully. The designated-verifier weights can be stored in the blockchain system or included in the verifier signature data. When adding a signature on received transaction information, each verifier can encrypt the designated-verifier weight, add encrypted designated-verifier weight in the verifier signature data, and send the verifier signature data with the encrypted designated-verifier weight to the transaction initiator.

When the transaction data to be verified is verified successfully, the blockchain system can execute a smart contract, to execute a transaction corresponding to the transaction data to be verified. The smart contract can be designated by the transaction initiator. Alternatively, the smart contract can be designated in the blockchain system.

Figure 5:
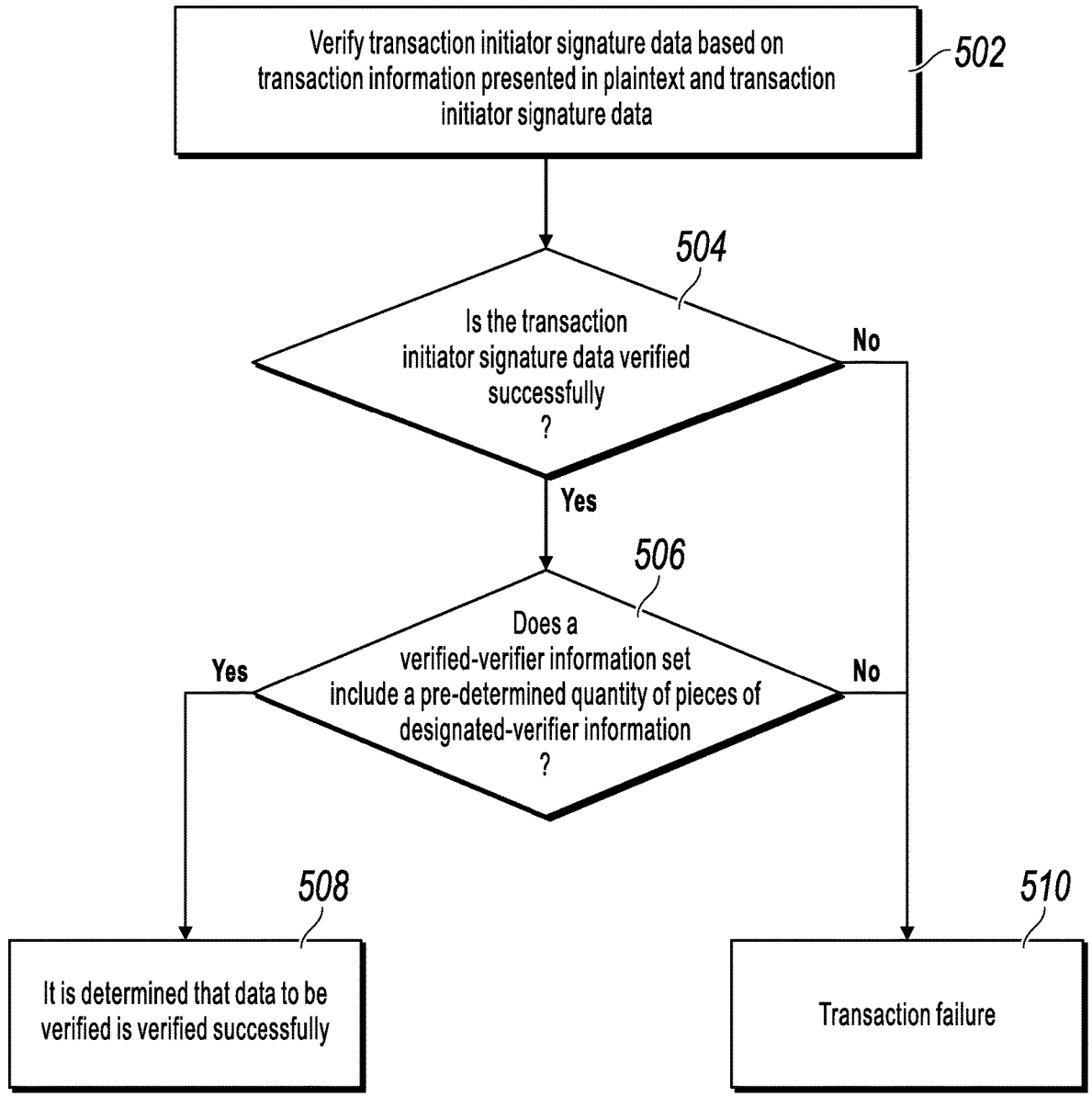
FIG. 5 is flowchart illustrating a process of verifying a transaction initiator and a process of verifying data to be verified in a transaction verification method, according to an implementation of the present application.

In another example, the signature data of each transaction party can be verified, to verify whether the corresponding transaction is initiated by an authorized transaction initiator. FIG. 5 is flowchart illustrating a process of verifying a transaction initiator and a process of verifying data to be verified in a transaction verification method, according to an implementation of the present application.

As shown in FIG. 5, at block 502, transaction initiator signature data is verified based on transaction information presented in plaintext and transaction initiator signature data. Then, at block 504, it is determined whether transaction initiator signature data is verified successfully. The transaction initiator signature data can include a transaction initiator signature and a transaction initiator public key. Verification of the transaction initiator signature data can include verification of the transaction initiator signature and verification of the transaction initiator public key. The verification process of the transaction initiator signature data is described below with reference to FIG. 6 and FIG. 7.

When the transaction initiator data is verified successfully, at block 506, it is determined whether the verified-verifier information set includes a pre-determined quantity of pieces of designated-verifier information. When the transaction initiator data is verified successfully and it is determined that the verified-verifier information set includes a pre-determined quantity of pieces of designated-verifier information, at block 508, it is determined that the transaction data to be verified is verified successfully; otherwise, at block 510, it is determined that the corresponding transaction is unauthorized, and the corresponding transaction fails.

Figure 6:
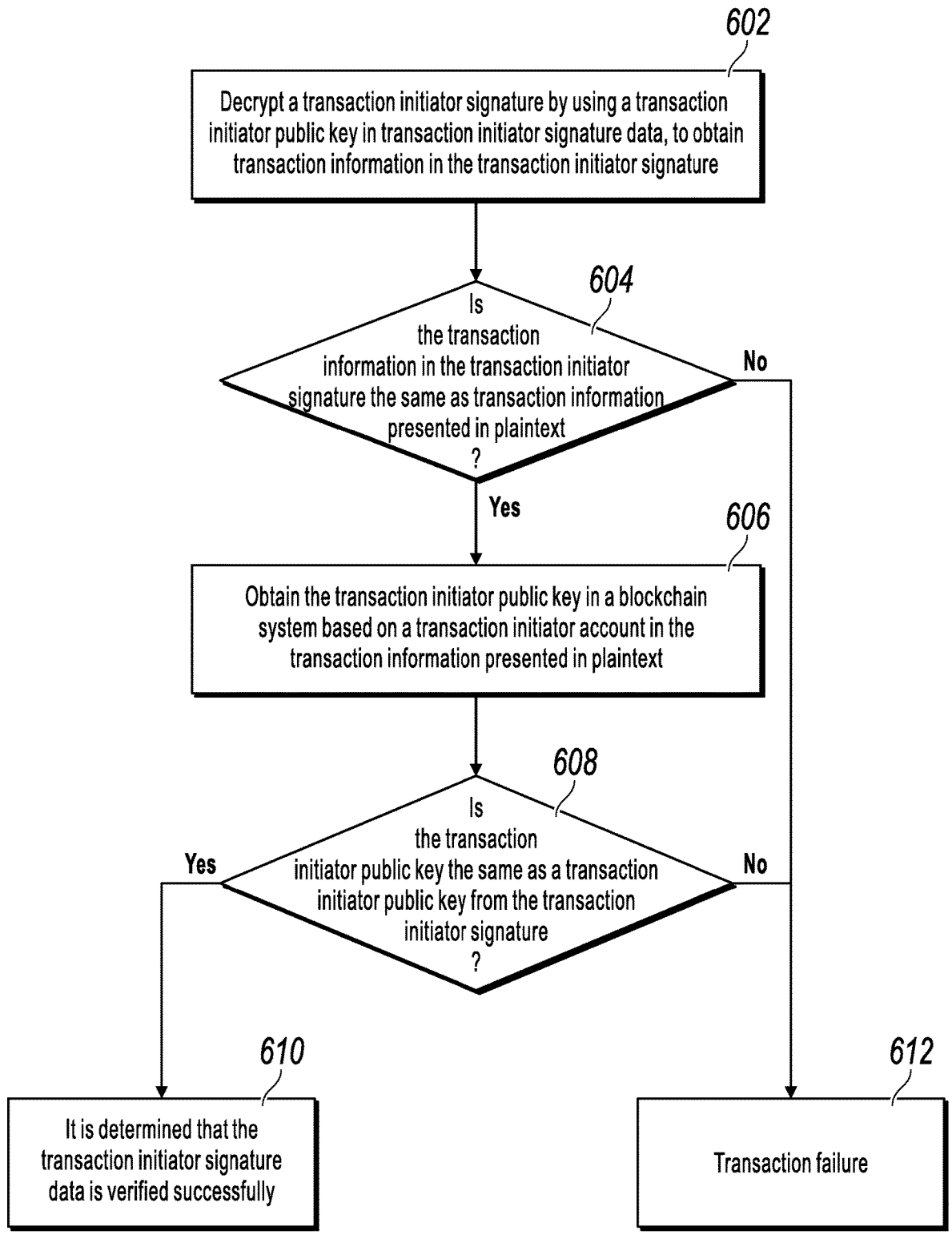
FIG. 6 is a flowchart illustrating an example process of verifying signature data of a transaction initiator in a transaction verification method, according to an implementation of the present application.

FIG. 6 is a flowchart illustrating an example process of verifying signature data of a transaction initiator in a transaction verification method, according to an implementation of the present application. In this example, transaction initiator signature data can include a transaction initiator public key and a transaction initiator signature.

As shown in FIG. 6, at block 602, the transaction initiator signature is decrypted by using the transaction initiator public key in the transaction initiator signature data, to obtain transaction information in the transaction initiator signature. Then, at block 604, it is determined whether the transaction information obtained through decryption is the same as transaction information presented in plaintext in transaction data to be verified. In an example, the transaction information obtained through decryption and the transaction information presented in plaintext can be separately hashed to obtain two hash values, and then the two hash values are compared to determine whether they are the same.

When the transaction information obtained by encrypting the transaction initiator signature is the same as the transaction information presented in plaintext in the transaction data to be verified, at block 606, a transaction initiator public key in the blockchain system is obtained based on a transaction initiator account in the transaction information presented in plaintext. When each transaction party participates in a blockchain network, the public key of the transaction party is sent to and stored in the blockchain system. As such, the transaction initiator account can be obtained from the transaction information presented in plaintext, and then a corresponding transaction initiator public key can be obtained from the blockchain system based on the transaction initiator account. A blockchain system that is implemented based on Ethernet is used as an example. The transaction initiator public key can be obtained from the world state of the blockchain.

Then, at block 608, it is determined whether the transaction initiator public key obtained from the blockchain system is the same as the transaction initiator public key from the transaction initiator signature. When the transaction initiator public key obtained from the blockchain system and the transaction initiator public key from the transaction initiator signature are the same, it indicates that the transaction initiator is an authorized user of the transaction initiator public key. As such, at block 610, it is determined that the transaction initiator signature data is verified successfully. When the transaction initiator public key obtained from the blockchain system and the transaction initiator public key from the transaction initiator signature are different, it indicates that the transaction initiator is not an authorized user of the transaction initiator public key. As such, at block 612, it is determined that the transaction initiator signature data is not verified successfully, and the corresponding transaction fails.

The processes in FIG. 6 can alternatively be arranged in another order. For example, when it is determined that the transaction initiator public key in the blockchain system is the same as the transaction initiator public key in the transaction initiator data, the transaction initiator signature is verified by using the transaction initiator public key.

Figure 7:
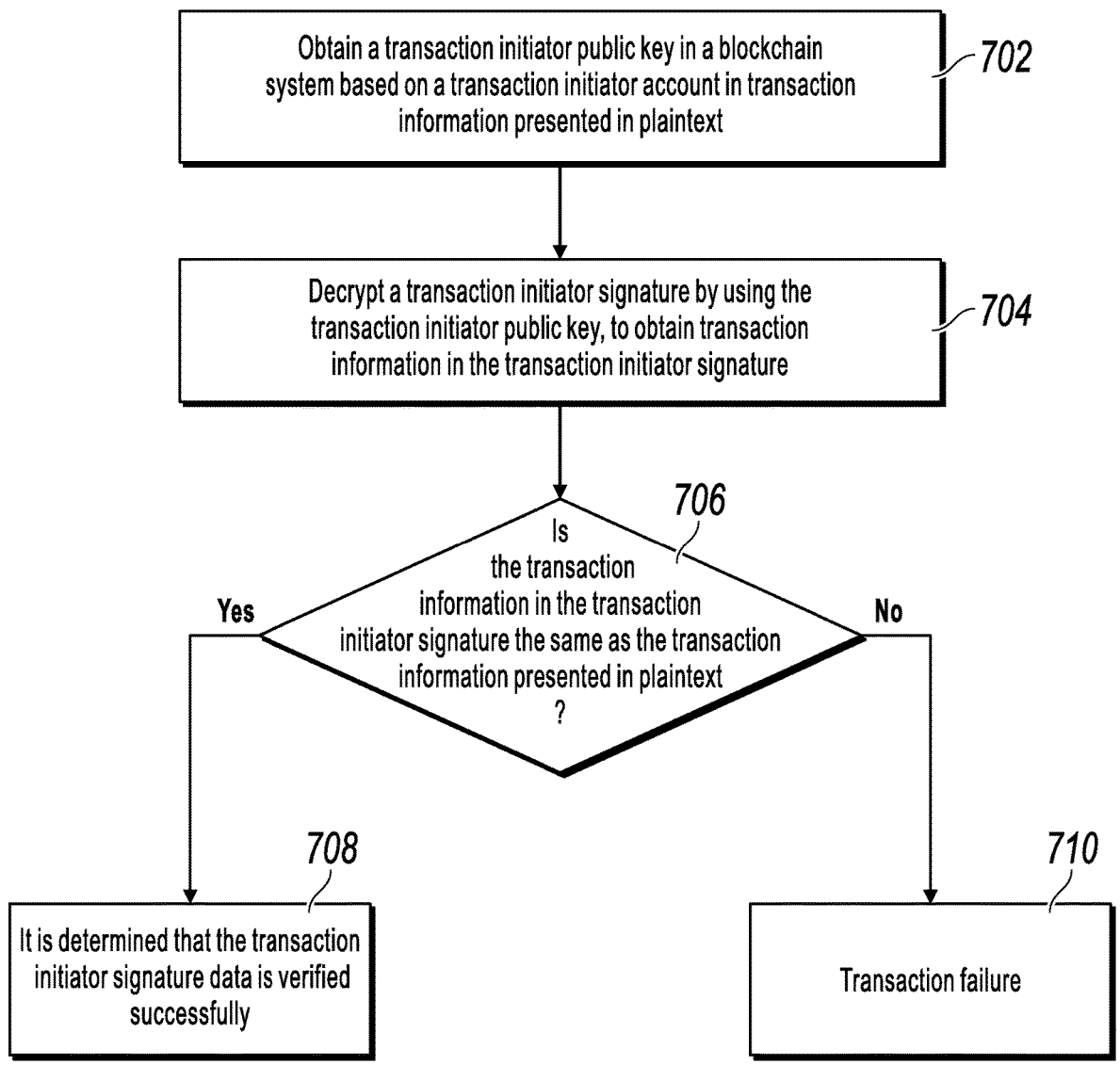
FIG. 7 is flowchart illustrating another example process of verifying signature data of a transaction initiator in a transaction verification method, according to an implementation of the present application.

FIG. 7 is flowchart illustrating another example process of verifying signature data of a transaction initiator in a transaction verification method, according to an implementation of the present application. In this example, transaction initiator signature data includes a transaction initiator signature.

As shown in FIG. 7, at block 702, a transaction initiator public key in a blockchain system is obtained based on a transaction initiator account in transaction information presented in plaintext.

After the transaction initiator public key is obtained, at block 704, a transaction initiator signature is decrypted by using the transaction initiator public key, to obtain transaction information in the transaction initiator signature. Then, at block 706, it is determined whether the transaction information obtained through decryption is the same as transaction information presented in plaintext in transaction data to be verified. When the transaction information obtained through decryption is the same as the transaction information presented in plaintext in the transaction data to be verified are the same, it indicates that the transaction initiator is an authorized user of the transaction initiator public key. As such, at block 708, it is determined that the transaction initiator signature data is verified successfully. When the transaction information obtained through decryption is the same as the transaction information presented in plaintext in the transaction data to be verified are different, it indicates that the transaction initiator is not an authorized user of the transaction initiator public key. As such, at block 710, it is determined that the transaction initiator signature data is not verified successfully, and the corresponding transaction fails.

Figure 8:
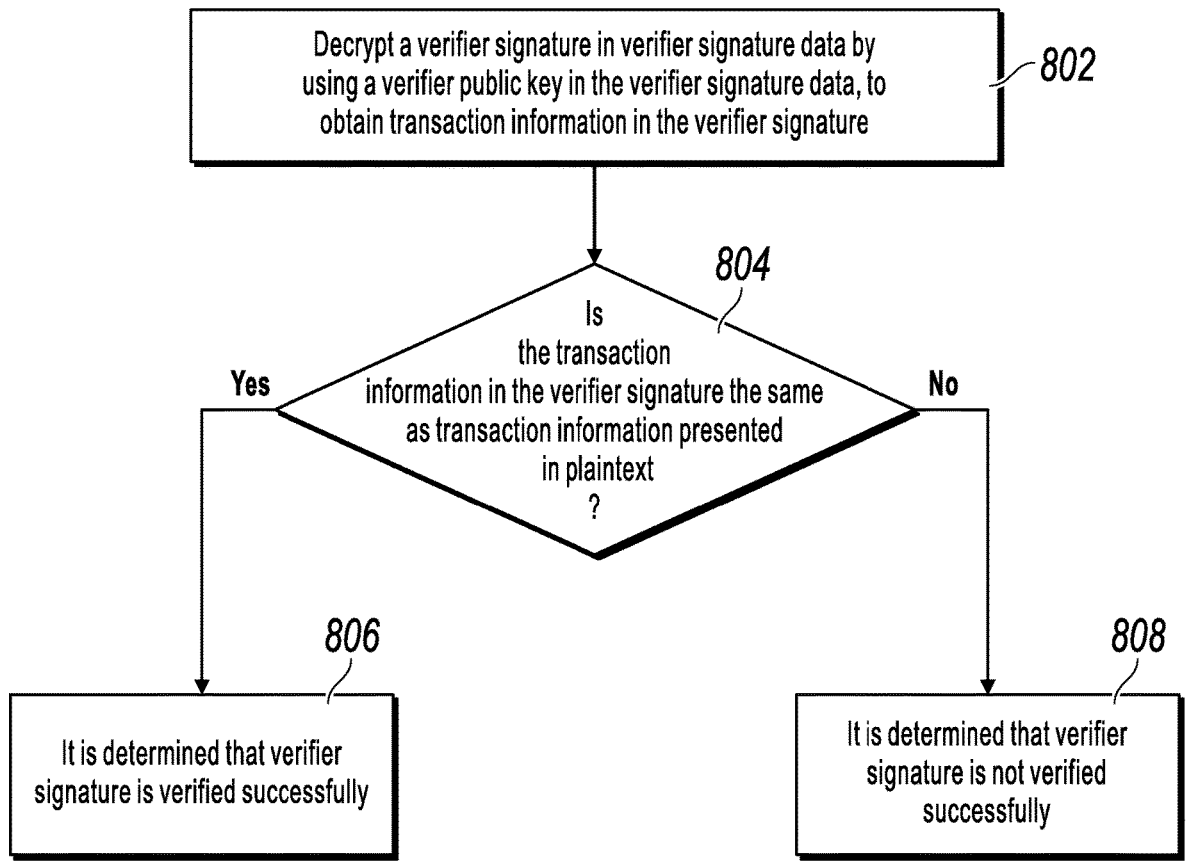
FIG. 8 is flowchart illustrating an example process of verifying a signature of a transaction initiator in a transaction verification method, according to an implementation of the present application.

FIG. 8 is flowchart illustrating an example process of verifying a signature of a transaction initiator in a transaction verification method, according to an implementation of the present application. In this example, transaction initiator signature data includes a transaction initiator public key.

As shown in FIG. 8, at block 802, the verifier signature in the verifier signature data is decrypted by using the verifier public key in the verifier signature data, to obtain transaction information in the verifier signature.

Then, at block 804, it is determined whether the transaction information obtained by encrypting the verifier signature is the same as transaction information presented in plaintext in transaction data to be verified. In an example, the transaction information obtained by encrypting the verifier signature and the transaction information presented in plaintext can be separately hashed to obtain two hash values, and then the two hash values are compared to determine whether they are the same.

When the two hash values are the same, at block 806, it is determined that the verifier signature data is verified successfully. When the two hash values are different, at block 808, it is determined that the verifier signature data is not verified successfully. After all the verifier signatures are verified, a verified-verifier public key set can be generated based on the verifier public keys of the successfully verified verifiers.

The designated-verifier information in the transaction data to be verified can include a designated-verifier public key. Correspondingly, the designated-verifier information set can be a designated-verifier public key set. In another example, when the verifier signature data includes a verifier public key, the designated-verifier information can further include a designated-verifier account. Correspondingly, the designated-verifier information set is a designated-verifier account set. Now, a corresponding designated-verifier public key in a blockchain system can be obtained based on at least one designated-verifier account in the designated-verifier account set, to obtain a designated-verifier public key set.

After each verifier signature is verified, the verified-verifier public key set and the designated-verifier public key set can be compared to determine whether the verified-verifier public key set includes a pre-determined quantity of designated-verifier public keys in the designated-verifier public key set. When the verified-verifier public key set includes a pre-determined quantity of designated-verifier public keys, it is determined that the transaction data to be verified is verified successfully.

A designated verifier can have a plurality of public keys. When adding a signature on the transaction data to generate verifier signature data, the designated verifier can select the private key corresponding to one of the public keys to add the signature, and add the corresponding public key into the verifier signature data. Each public key of the designated verifier can have a respective public key weight, and the designated verifier can determine to use a public key with a greater weight or a smaller weight based on service scenarios. In this example, when the verified-verifier information set includes a pre-determined quantity of pieces of designated-verifier information in the designated-verifier information set, it can be determined whether the sum of the public key weights of the public keys used by the designated quantity of designated verifiers is not less than a second pre-determined value. When the sum of the public key weights of the public keys used by the designated quantity of designated verifiers is not less than the second pre-determined value, it can be determined that the data to be verified is verified successfully.

The pubic key weights of the designated-verifier public keys can be stored in the blockchain system as indexes, so that a corresponding public key weight can be queried based on a designated-verifier public key. In another example, a public key weight can alternatively be included in a designated verifier signature.

In an example, when the transaction data to be verified is verified successfully, the public keys of the successfully verified designated verifiers can be stored locally for use during execution of a smart contract. The smart contract can be configured based on service scenarios. In some service scenarios, the smart contract can include a rule for using a designated-verifier public key. When a designated-verifier public key is stored, the public key query process can be omitted in the execution process of the smart contract.

Figure 9:
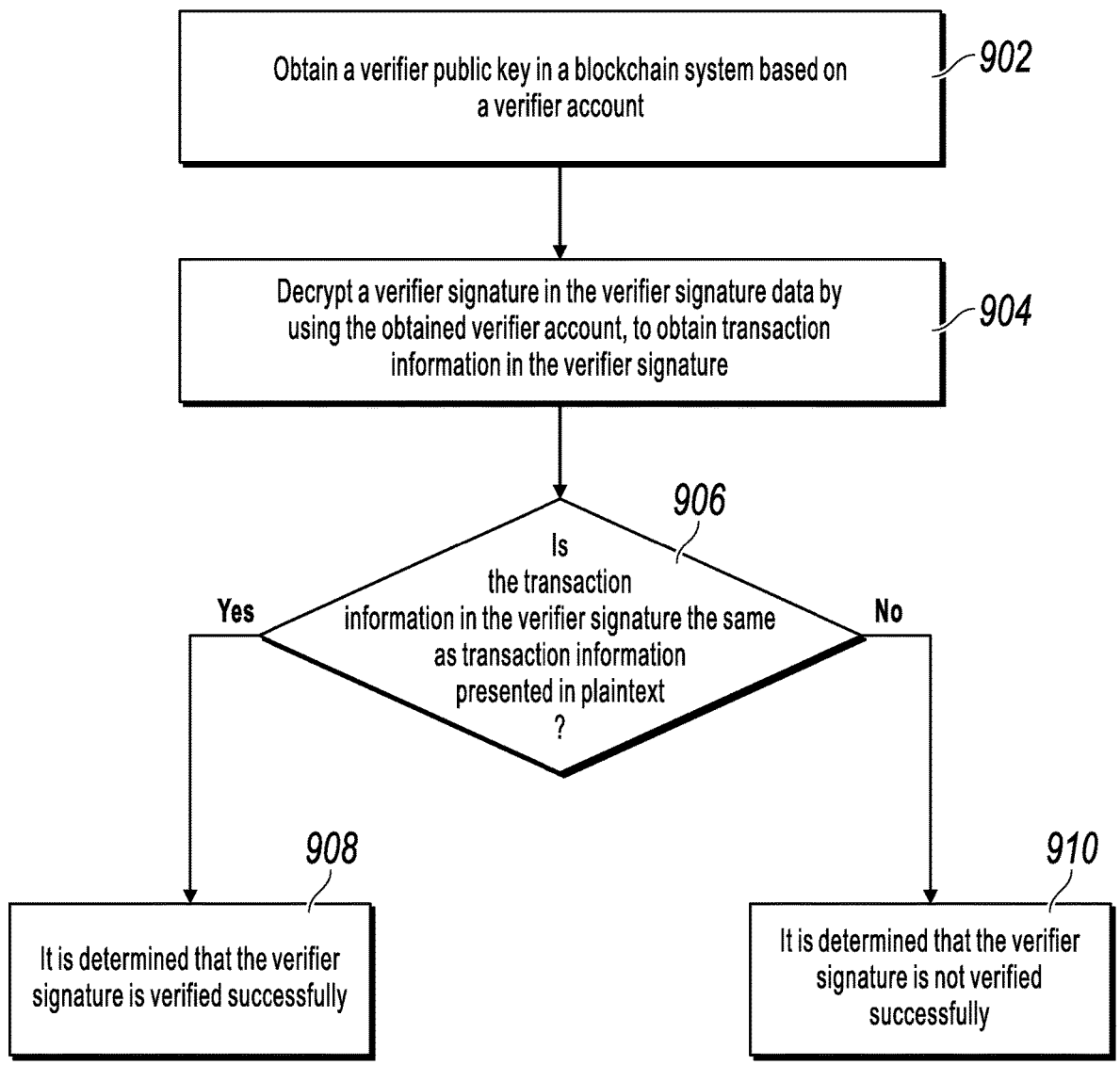
FIG. 9 is flowchart illustrating another example process of verifying a signature of a transaction initiator in a transaction verification method, according to an implementation of the present application.

In another example, the verifier signature data can include a verifier account. Verification of the verifier signature is described based on the example shown in FIG. 9. FIG. 9 is flowchart illustrating another example process of verifying a signature of a transaction initiator in a transaction verification method, according to an implementation of the present application.

As shown in FIG. 9, at block 902, a verifier public key in a verifier blockchain system is obtained based on a verifier account in verifier signature data. Because each transaction party has stored a public key in the blockchain system when participating in the blockchain network, the verifier public key can be obtained based on the verifier account. For example, the verifier public key can be obtained from the world state.

After the verifier public key is obtained, at block 904, the verifier signature in the verifier signature data is decrypted by using the obtained verifier public key, to obtain transaction information in the verifier signature.

Then, at block 906, it is determined whether the transaction information obtained by decrypting the verifier signature is the same as transaction information presented in plaintext in transaction data to be verified. When the transaction information obtained by decrypting the verifier signature and the transaction information presented in plaintext in transaction data to be verified are the same, at block 908, it is determined that the verifier signature is verified successfully. When the transaction information obtained by decrypting the verifier signature and the transaction information presented in plaintext in transaction data to be verified are different, at block 910, it is determined that the verifier signature is not verified successfully.

After all the verifier signatures are verified, a verified-verifier account set can be generated based on the verifier accounts of the successfully verified verifiers. Now, the designated-verifier information in the transaction data to be verified can include a designated-verifier account. After the verified-verifier account set is obtained, the verified-verifier public key set and the designated-verifier public key set can be compared to determine whether the verified-verifier public key set includes a pre-determined quantity of designated-verifier public keys. As such, it can be determined whether the quantity of designated verifiers of the corresponding transaction meets the requirement.

Further, a verified-verifier public key set can be generated based on the verifier public keys of the successfully verified verifiers. Correspondingly, the designated-verifier information in the transaction data to be verified can include a designated-verifier public key, and the designated-verifier information set is a designated-verifier public key set. After the verified-verifier account set is obtained, the verified-verifier public key set and the designated-verifier public key set can be compared to determine whether the verified-verifier public key set includes a pre-determined quantity of designated-verifier public keys.

Figure 10:
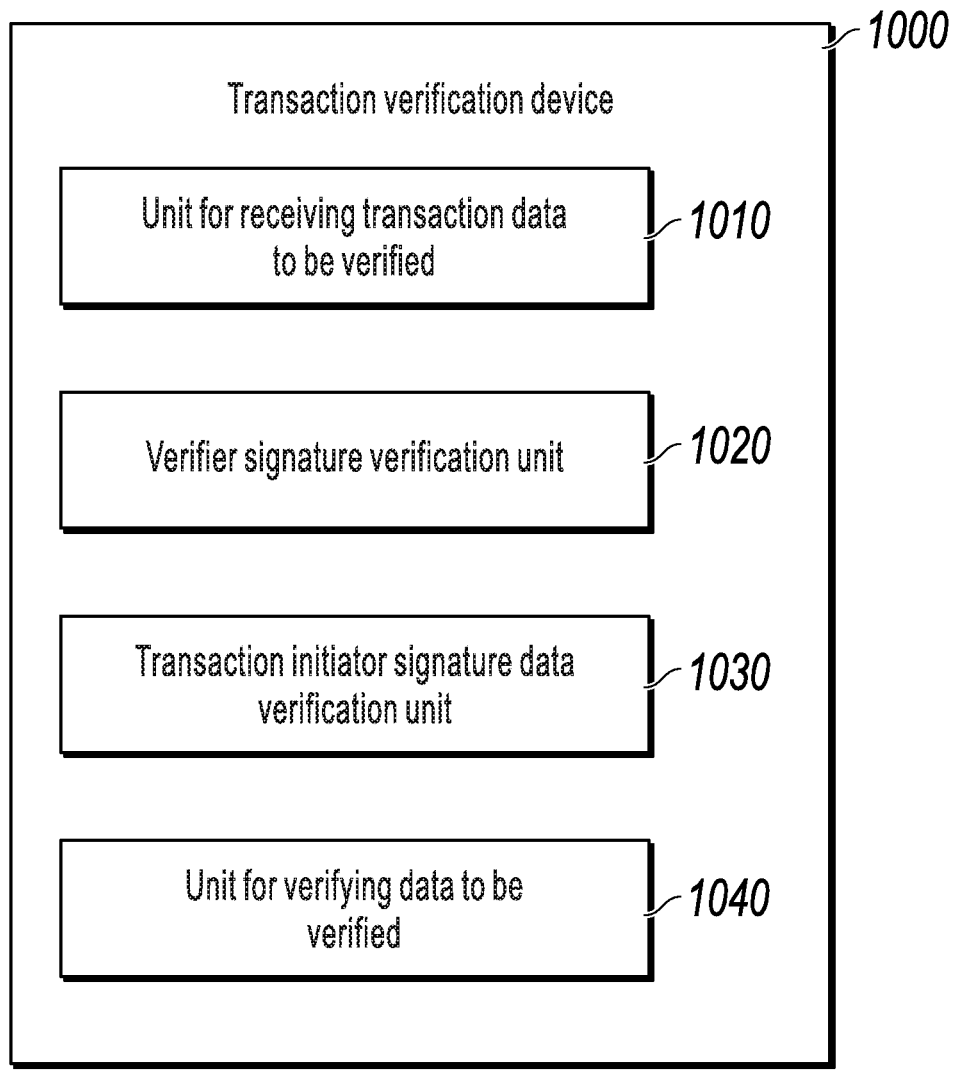
FIG. 10 is a structural block diagram illustrating a transaction verification device, according to an implementation of the present application.

FIG. 10 is a structural block diagram illustrating a transaction verification device, according to an implementation of the present application. As shown in FIG. 10, the transaction verification device 1000 includes a unit for receiving transaction data to be verified 1010, a verifier signature verification unit 1020, a transaction initiator signature data verification unit 1030, and a unit for verifying data to be verified 1040.

The unit for receiving transaction data to be verified 1010 is configured to receive the transaction data to be verified, where the transaction to be verified includes transaction information presented in plaintext and at least one piece of verifier signature data, the transaction information presented in plaintext includes a designated-verifier information set, the designated-verifier information set includes verifier information of at least one verifier designated to verify the transaction information presented in plaintext, and the verifier signature data includes a verifier signature.

The verifier signature verification unit 1020 is configured to: for the verifier signature in the at least one piece of verifier signature data, verify the verifier signature in the verifier signature data based on the verifier signature data and the transaction information presented in plaintext, to obtain a verified-verifier information set. The transaction initiator signature data verification unit 1030 is configured to verify the transaction initiator signature data based on the transaction information presented in plaintext and the transaction initiator signature data.

The unit for verifying data to be verified 1040 is configured to: determine that the data to be verified is verified successfully when the verified-verifier information set includes a pre-determined quantity of pieces of designated-verifier information in the designated-verifier information set, and the transaction initiator signature data is verified successfully. In an example, the transaction verification device may not include the transaction initiator signature data verification unit. In this case, the unit for verifying data to be verified 1040 can be configured to: determine that the data to be verified is verified successfully when the verified-verifier information set includes a pre-determined quantity of pieces of designated-verifier information in the designated-verifier information set.

In an example, each designated verifier can have a respective designated-verifier weight, and the unit for verifying data to be verified 1040 can be configured to: determine that the data to be verified is verified successfully when the verified-verifier information set includes a pre-determined quantity of pieces of designated-verifier information in the designated-verifier information set, and the sum of designated-verifier weights corresponding to the pre-determined quantity of pieces of designated-verifier information is not less than a first pre-determined value.

Figure 11:
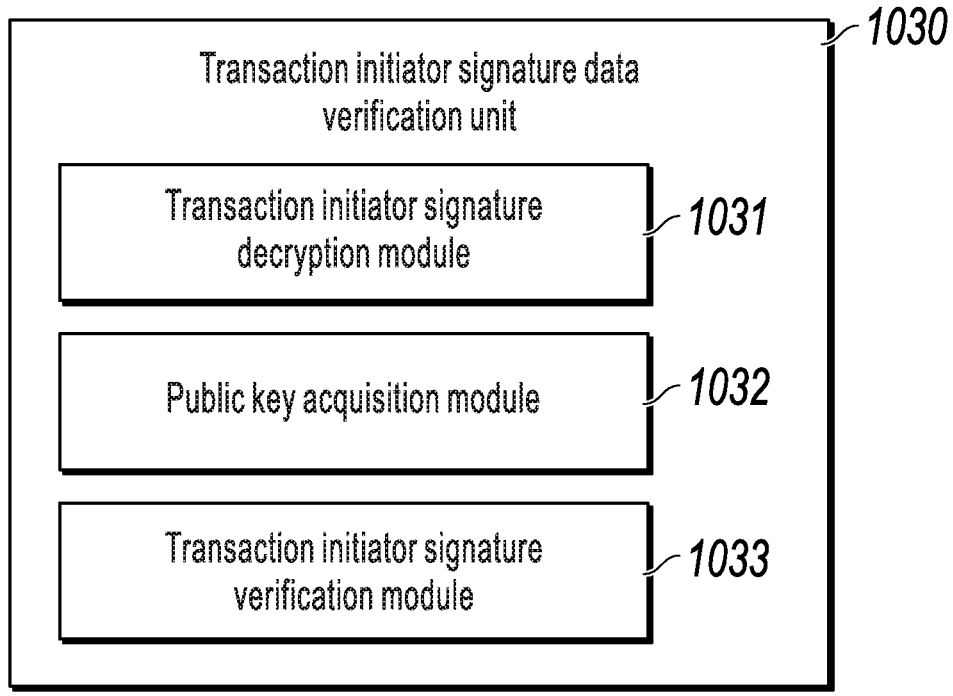
FIG. 11 is a structural block diagram illustrating an example of a transaction initiator signature data verification unit in the transaction verification device illustrated in FIG. 10.

FIG. 11 is a structural block diagram illustrating an example of a transaction initiator signature data verification unit in the transaction verification device illustrated in FIG. 10. As shown in FIG. 11, the transaction initiator signature data verification unit 1030 includes a transaction initiator signature decryption module 1031, a public key acquisition module 1032, and a transaction initiator signature verification module 1033. In this example, transaction initiator signature data can further include a transaction initiator public key.

The transaction initiator signature decryption module 1031 is configured to decrypt the transaction initiator signature by using the transaction initiator public key in the transaction initiator signature data, to obtain transaction information in the transaction initiator signature. The public key acquisition module 1032 is configured to obtain a transaction initiator public key in the blockchain system based on the transaction initiator account in the transaction information presented in plaintext. The transaction initiator signature verification module 1033 is configured to determine that the transaction initiator signature data is verified successfully when the transaction information in the transaction initiator signature is the same as the transaction information presented in plaintext, and transaction initiator public key in the transaction initiator signature data is the same as the transaction initiator public key in the blockchain system.

Figure 12:
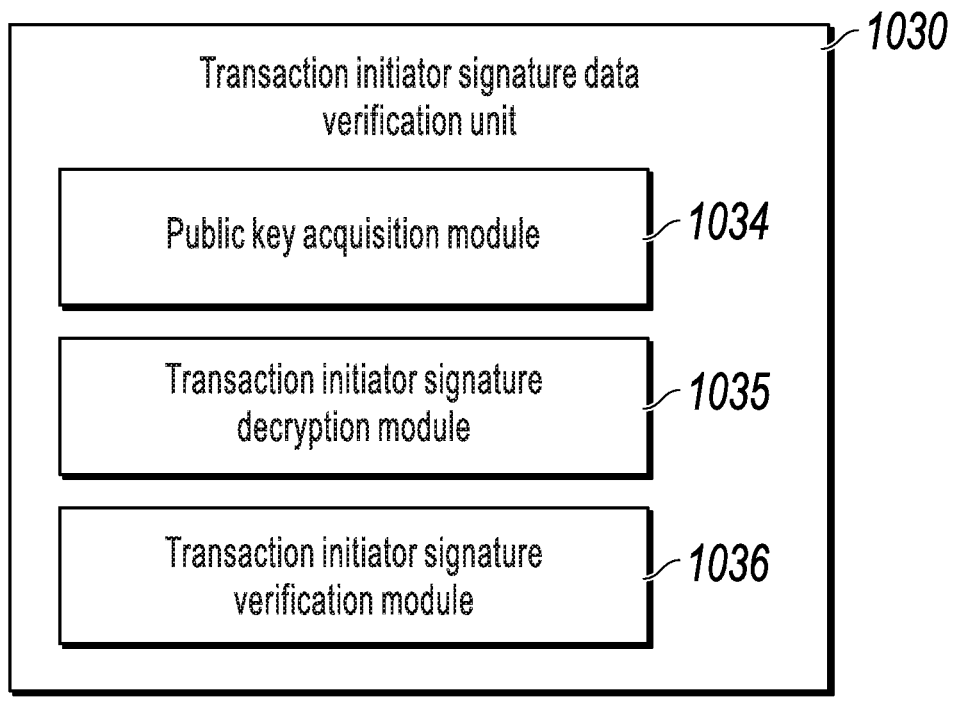
FIG. 12 is a structural block diagram illustrating another example of a transaction initiator signature data verification unit in the transaction verification device illustrated in FIG. 10.

FIG. 12 is a structural block diagram illustrating another example of a transaction initiator signature data verification unit in the transaction verification device illustrated in FIG. 10. The transaction initiator signature data verification unit 1030 includes a public key acquisition module 1034, a transaction initiator signature decryption module 1035, and a transaction initiator signature verification module 1036.

The public key acquisition module 1034 is configured to obtain a transaction initiator public key in the blockchain system based on the transaction initiator account in the transaction information presented in plaintext. The transaction initiator signature decryption module 1035 is configured to decrypt the transaction initiator signature by using the transaction initiator public key in the transaction initiator signature data, to obtain transaction information in the transaction initiator signature. The transaction initiator signature verification module 1036 is configured to determine that the transaction initiator signature is verified successfully when the transaction information in the transaction initiator signature is the same as the transaction information presented in plaintext.

Figure 13:
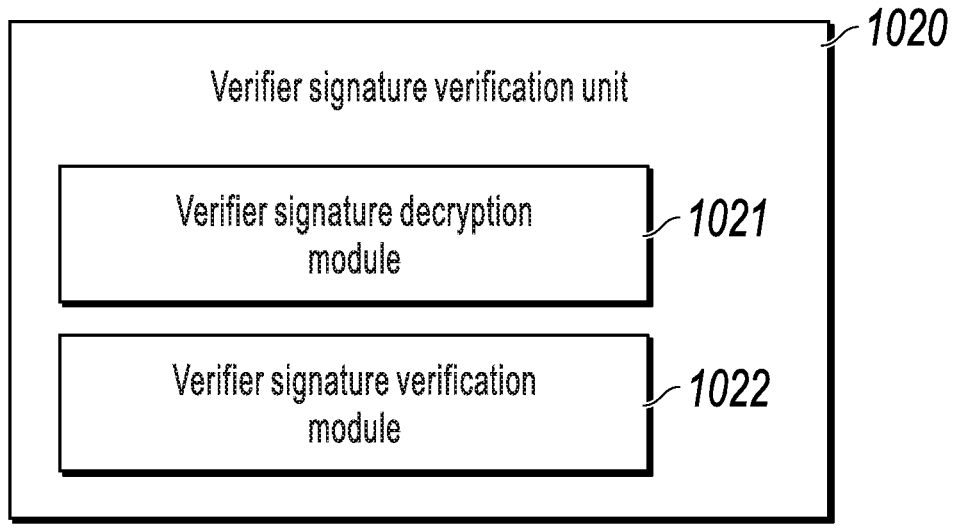
FIG. 13 is a structural block diagram illustrating an example of a verifier signature verification unit in the transaction verification device illustrated in FIG. 10.

FIG. 13 is a structural block diagram illustrating an example of a verifier signature verification unit in the transaction verification device illustrated in FIG. 10. As shown in FIG. 13, the verifier signature verification unit 1020 includes a verifier signature decryption module 1021 and a verifier signature verification module 1022. In this example, verifier signature data can further include a verifier public key.

The verifier signature decryption module 1021 is configured to decrypt the verifier signature in the verifier signature data by using the verifier public key in the verifier signature data, to obtain transaction information in the verifier signature. The verifier signature verification module 1022 is configured to determine that the verifier signature is verified successfully when the transaction information in the verifier signature is the same as the transaction information presented in plaintext.

In another example, the designated-verifier information can include a designated-verifier account, and the verified-verifier information set can include a verified-verifier account set. In this example, the transaction verification device can further include a designated-verifier public key set acquisition unit (not shown in the figure). The designated-verifier public key set acquisition unit is configured to obtain a corresponding designated-verifier public key in a blockchain system based on at least one designated-verifier account in the designated-verifier account set, to obtain a designated-verifier public key set. In this case, the unit for verifying data to be verified is configured to: determine that the data to be verified is verified successfully when the verified-verifier public key set includes a pre-determined quantity of designated-verifier public keys.

In another example, the designated verifier public key of the at least one designated verifier can have a designated-verifier weight, and the unit for verifying data to be verified can be configured to: determine that the data to be verified is verified successfully when the verified-verifier information set includes a pre-determined quantity of pieces of designated-verifier information in the designated-verifier information set, and the sum of the public key weights corresponding to the pre-determined quantity of pieces of designated-verifier information is not less than a second pre-determined value.

Figure 14:
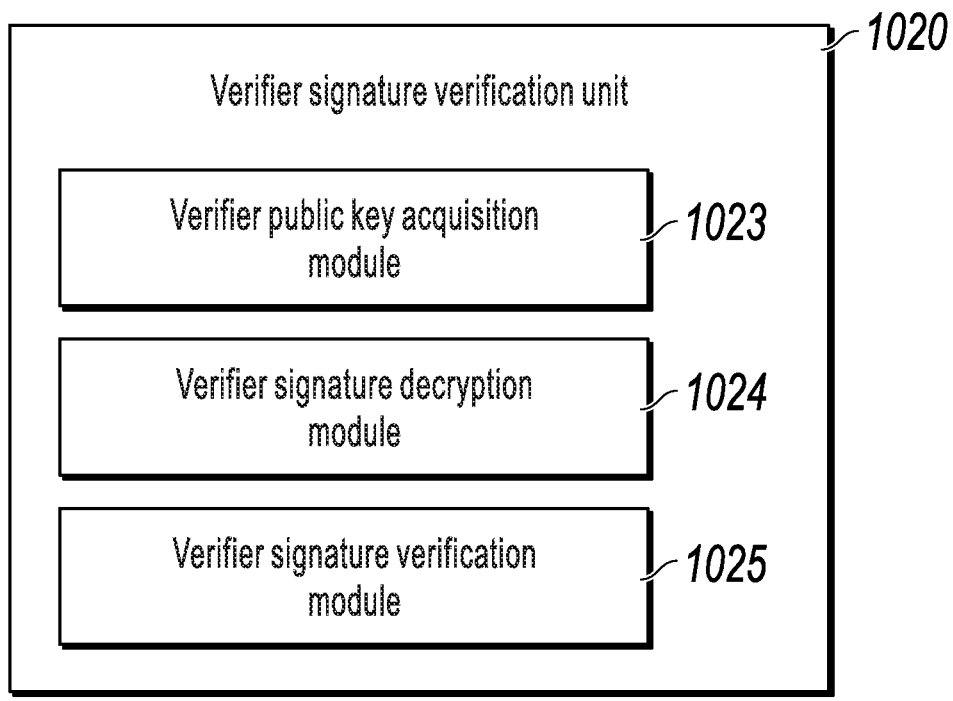
FIG. 14 is a structural block diagram illustrating another example of a verifier signature verification unit in the transaction verification device illustrated in FIG. 10.

FIG. 14 is a structural block diagram illustrating another example of a verifier signature verification unit in the transaction verification device illustrated in FIG. 10. As shown in FIG. 14, the verifier signature verification unit 1020 includes a verifier public key acquisition module 1023, a verifier signature decryption module 1024, and a verifier signature verification module 1025. In this example, the verifier signature data can further include a verifier account.

The verifier public key acquisition module 1023 is configured to obtain a verifier public key in the blockchain system based on the verifier account. The verifier signature decryption module 1024 is configured to decrypt the verifier signature in the verifier signature data by using the verifier public key in the verifier signature data, to obtain transaction information in the verifier signature. The verifier signature verification module 1025 is configured to determine that the verifier signature is verified successfully when the transaction information in the verifier signature is the same as the transaction information presented in plaintext.

The forgoing has described the implementations of the transaction verification method and device according to the present application with reference to FIG. 1 and FIG. 14. Details mentioned in the foregoing descriptions about the method implementations are also applicable to the device implementations in the present application.

The transaction verification device in the present application can be implemented by using hardware, software, or a combination of hardware and software. The implementations of the present specification are described in a progressive way. For same or similar parts of the implementations, mutual references can be made to the implementations.

The transaction verification device in the present application can be implemented by using hardware, software, or a combination of hardware and software. The software-based implementation is used as an example. As a logic device, the transaction verification device is formed by reading, by the processor in a device where the transaction verification device is located, corresponding instructions from a storage device to a memory for running. In the present application, for example, the transaction verification device is implemented by using a computing device.

Figure 15:
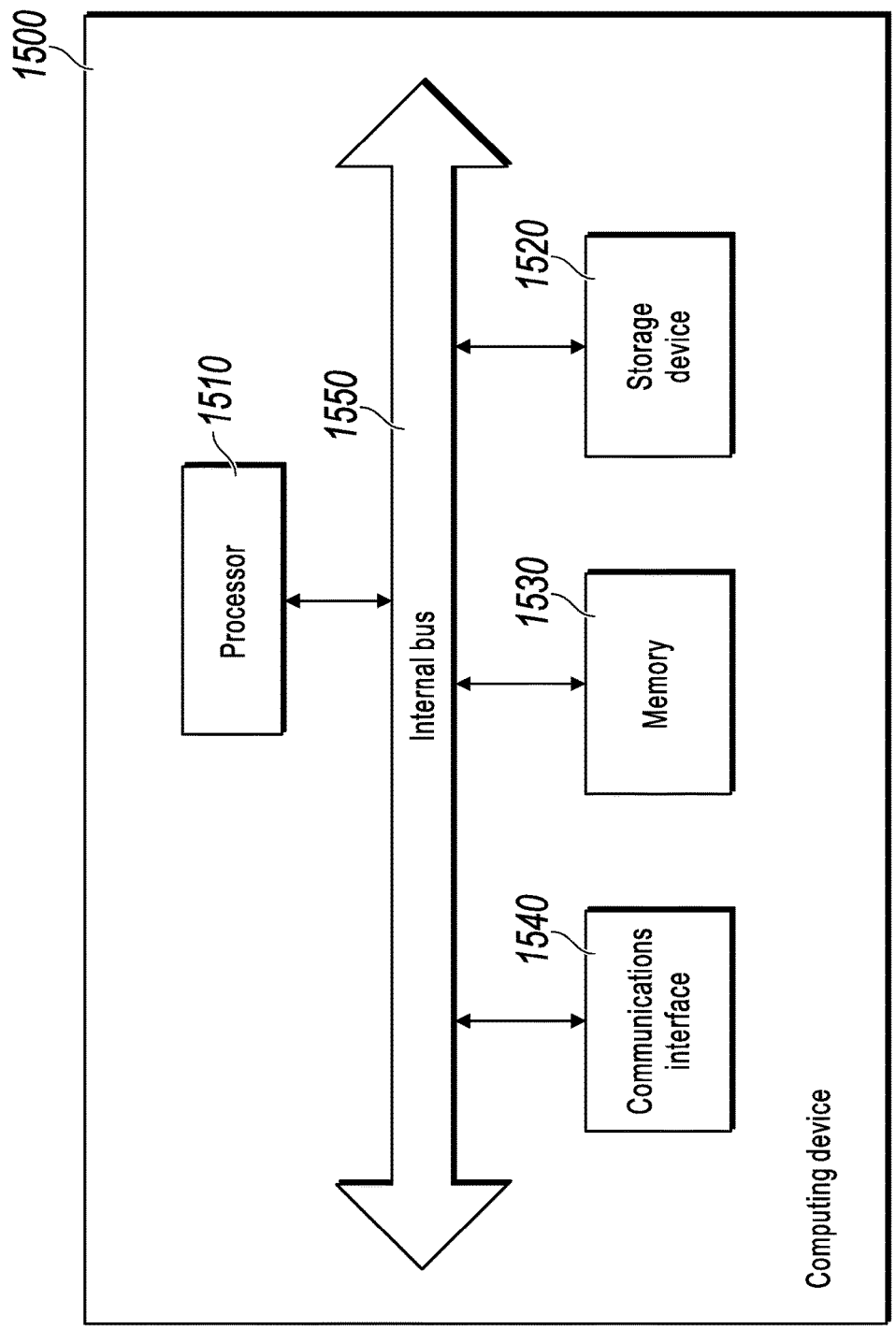
FIG. 15 is a structural block diagram illustrating a computing device, according to an implementation of the present application.

FIG. 15 is a structural block diagram illustrating a computing device, according to an implementation of the present application. As shown in FIG. 15, the computing device 1500 includes a processor 1510, a storage device 1520, a memory 1530, a communications interface 1540, and an internal bus 1550. The processor 1510, the storage device (for example, a non-volatile storage device) 1520, the memory 1530, and the communications interface 1540 are connected through the bus 1550. According to an implementation, the computing device 1500 can include at least one processor 1510, where the at least one processor 1510 executes at least one computer readable instruction (that is, the foregoing elements that are implemented in a form of software) that is stored or coded in the computer readable storage medium (that is, the storage device 1520).

In an implementation, computer readable instructions are stored in the storage device 1520, and when the instructions are executed, the at least one processor 1510 is enabled to perform the following operations: receiving transaction data to be verified, where the transaction to be verified includes transaction information presented in plaintext and at least one piece of verifier signature data, the transaction information presented in plaintext includes a designated-verifier information set, the designated-verifier information set includes verifier information of at least one verifier designated to verify the transaction information presented in plaintext, and the verifier signature data includes a verifier signature; for the verifier signature in the at least one piece of verifier signature data, verifying the verifier signature in the verifier signature data based on the verifier signature data and the transaction information presented in plaintext, to obtain a verified-verifier information set; and determining that the data to be verified is verified successfully when the verified-verifier information set includes a pre-determined quantity of pieces of designated-verifier information in the designated-verifier information set.

It should be understood that when the computer readable instructions stored in the storage device 1520 are executed, the at least one processor 1510 is enabled to perform the operations and functions that are described above with reference to FIG. 1 to FIG. 15 in the implementations in the present application.

According to an implementation, a program product (for example, a non-transitory machine readable medium) is provided. The non-transitory machine readable medium can store instructions (that is, the foregoing elements that are implemented in a form of software), and when the instructions are executed by a machine, the machine is enabled to perform the operations and functions described above with reference to FIG. 1 to FIG. 15 in the implementations in the present application.

Specifically, a system or device equipped with a readable storage medium can be provided, and the readable storage medium stores software program code used for implementing the functions described in any one of the foregoing implementations, and the computer or processor of the system or device is enabled to read execute the instructions stored in the readable storage medium.

In this case, the functions in any one of the foregoing implementations can be implemented by using the program code read from the readable storage medium. Therefore, the computer readable code and the readable storage medium that stores the computer readable code constitute a part of the present application.

Examples of the readable storage medium include a floppy disk, a hard disk, a magneto-optical disk, a compact disc (for example, CD-ROM, CD-R, CD-RW, DVD-ROM, DVD-RAM, DVD-RW, or DVD-RW) a magnetic tape, a volatile memory card, and ROM. Optionally, program code can be downloaded from a server or a cloud through a communications network.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

Not all the steps and units in the foregoing processes and system structural diagrams are mandatory. Some steps or units can be omitted based on an actual requirement. The execution sequence of the steps is not fixed, and can be determined based on a requirement. The device structures described in the foregoing implementations may be logical structure. That is, some units may be implemented by using one physical entity, may be implemented by using a plurality of physical entities, or may be jointly implemented by some components in a plurality of independent devices.

The term "example" used through the present specification means "being used as an example", and does not mean "being preferred over" or "being advantageous over" other implementations. Specific implementations include specific details provided to facilitate understanding of the described technologies. However, these technologies can be implemented with these specific details. In some examples, well-known structures and devices are illustrated by using block diagrams to facilitate understanding of the concepts described in the implementations.

The foregoing has described in detail the optional implementations of the present application with reference to the accompanying drawings. However, the implementations of the present application are not limited to the specific details in the foregoing implementations. Various simple variations can be made to the technical solutions in the implementations of the present application without departing from the technical ideas of the implementations of the present application, and these simple variations fall within the protection scope of the implementations of the present application.

The foregoing descriptions about the content of the present application are provided to enable a person of ordinary skill in the art to implement or use the content of the present application. For a person of ordinary skill in the art, various modifications on the content of the present application are apparent, and general principles defined in the present specification can be used for other variations without departing from the protection scope of the content of the present application. Therefore, the content of the present application is not limited to the examples and designs described in the present specification. Instead, the content of the present application is consistent with the broadest scope of the principles and novel characteristics disclosed in the present specification.

What is claimed is:

1. A computer-implemented transaction verification method, comprising:
receiving, by a blockchain system, transaction data to be verified, wherein:
the transaction data comprises plaintext transaction information and a plurality of pieces of verifier signature data, wherein,
each piece of verifier signature data of the plurality of pieces of verifier signature data comprises a digital signature generated by a respective verifier using one of a plurality of private keys of the respective verifier;
each private key of each verifier corresponds to a public key of the verifier; and
each public key of each verifier comprises a weight and the weight of each public key of the verifier is different from the weight of each other public key of the verifier;
the plaintext transaction information comprises a designated-verifier information set that identifies designated verifiers that have been designated to verify the plaintext transaction information and comprises, for each of one or more of the designated verifiers, a piece of designated-verifier information;
obtaining, by the blockchain system, an authenticated information set by verifying each digital signature in the transaction data using the public key corresponding to the private key used to generate the digital signature, wherein the authenticated information set comprises the piece of designated-verifier information for each verifier for which the digital signature is successfully verified;
determining, for each verified digital signature, the weight of the public key used to verify the digital signature;
determining a sum of the weights of the public keys used to verify the digital signatures; and
determining, by the blockchain system, that the transaction data is verified successfully when the authenticated information set comprises a pre-determined quantity of pieces of designated-verifier information and the sum of the weights satisfies a pre-determined value.

2. The computer-implemented method of claim 1, wherein:
the designated-verifier information set specifies, for each designated verifier, a verifier account of the designated verifier;
the method further comprises obtaining, from a blockchain of the blockchain system, the public key for each designated verifier using the verifier account for each designated verifier; and
determining that the transaction data is verified successfully when the authenticated information set comprises a pre-determined quantity of pieces of designated-verifier information comprises determining that the transaction data is verified successfully when a quantity of obtained public keys comprises a pre-determined quantity of public keys.

3. The computer-implemented method of claim 1, wherein:
the transaction data further comprises transaction initiator signature data specific to the plaintext transaction information, the transaction initiator signature data comprising a transaction initiator signature;
the method further comprises verifying the transaction initiator signature data based on the plaintext transaction information and the transaction initiator signature data; and
determining that the transaction data is verified successfully comprises determining that the transaction data is verified successfully when the authenticated information set comprises a pre-determined quantity of pieces of designated-verifier information and the transaction initiator signature data is verified successfully.

4. The computer-implemented method of claim 3, wherein the transaction initiator signature data further comprises a transaction initiator public key, the method further comprising verifying the transaction initiator signature using the transaction initiator public key and the plaintext transaction information.

5. The computer-implemented method of claim 3, wherein:
the plaintext transaction information comprises data specifying a transaction initiator account;
verifying the transaction initiator signature data based on the plaintext transaction information and the transaction initiator signature data comprises:
obtaining a transaction initiator public key in the blockchain system based on the transaction initiator account in the plaintext transaction information; and
verifying the transaction initiator signature using the transaction initiator public key and the plaintext transaction information.

6. A non-transitory, computer-readable medium storing one or more instructions executable by a computer system to perform operations comprising:
receiving, by a blockchain system, transaction data to be verified, wherein:
the transaction data comprises plaintext transaction information and a plurality of pieces of verifier signature data, wherein,
each piece of verifier signature data of the plurality of pieces of verifier signature data comprises a digital signature generated by a respective verifier using one of a plurality of private keys of the respective verifier;
each private key of each verifier corresponds to a public key of the verifier; and
each public key of each verifier comprises a weight and the weight of each public key of the verifier is different from the weight of each other public key of the verifier;
the plaintext transaction information comprises a designated-verifier information set that identifies designated verifiers that have been designated to verify the plaintext transaction information and comprises, for each of one or more of the designated verifiers, a piece of designated-verifier information;
obtaining, by the blockchain system, an authenticated information set by verifying each digital signature in the transaction data using the public key corresponding to the private key used to generate the digital signature, wherein the authenticated information set comprises the piece of designated-verifier information for each verifier for which the digital signature is successfully verified;
determining, for each verified digital signature, the weight of the public key used to verify the digital signature;
determining a sum of the weights of the public keys used to verify the digital signatures; and
determining, by the blockchain system, that the transaction data is verified successfully when the authenticated information set comprises a pre-determined quantity of pieces of designated-verifier information and the sum of the weights satisfies a pre-determined value.

7. The non-transitory, computer-readable medium of claim 6, wherein:
the designated-verifier information set specifies, for each designated verifier, a verifier account of the designated verifier;
the operations further comprise obtaining, from a blockchain of the blockchain system, the public key for each designated verifier using the verifier account for each designated verifier; and
determining that the transaction data is verified successfully when the authenticated information set comprises a pre-determined quantity of pieces of designated-verifier information comprises determining that the transaction data is verified successfully when the obtained public keys comprises a pre-determined quantity of public keys.

8. The non-transitory, computer-readable medium of claim 6, wherein:
the transaction data further comprises transaction initiator signature data specific to the plaintext transaction information, the transaction initiator signature data comprising a transaction initiator signature;
the operations further comprise verifying the transaction initiator signature data based on the plaintext transaction information and the transaction initiator signature data; and
determining that the transaction data is verified successfully comprises determining that the transaction data is verified successfully when the authenticated information set comprises a pre-determined quantity of pieces of designated-verifier information and the transaction initiator signature data is verified successfully.

9. The non-transitory, computer-readable medium of claim 8, wherein the transaction initiator signature data further comprises a transaction initiator public key, the operations further comprise verifying the transaction initiator signature using the transaction initiator public key and the plaintext transaction information.

10. A computer-implemented system, comprising:
one or more computers; and one or more computer memory devices interoperably coupled with the one or more computers and having tangible, non-transitory, machine-readable media storing one or more instructions that, when executed by the one or more computers, perform operations comprising:
receiving, by a blockchain system, transaction data to be verified, wherein:
the transaction data comprises plaintext transaction information and a plurality of pieces of verifier signature data, wherein,
each piece of verifier signature data of the plurality of pieces of verifier signature data comprises a digital signature generated by a respective verifier using one of a plurality of private keys of the respective verifier;
each private key of each verifier corresponds to a public key of the verifier; and
each public key of each verifier comprises a weight and the weight of each public key of the verifier is different from the weight of each other public key of the verifier:
the plaintext transaction information comprises a designated-verifier information set that identifies designated verifiers that have been designated to verify the plaintext transaction information and comprises, for each of one or more of the designated verifiers, a piece of designated-verifier information;
obtaining, by the blockchain system, an authenticated information set by verifying each digital signature in the transaction data using the public key corresponding to the private key used to generate the digital signature, wherein the authenticated information set comprises the piece of designated-verifier information for each verifier for which the digital signature is successfully verified;
determining, for each verified digital signature, the weight of the public key used to verify the digital signature;
determining a sum of the weights of the public keys used to verify the digital signatures; and
determining, by the blockchain system, that the transaction data is verified successfully when the authenticated information set comprises a pre-determined quantity of pieces of designated-verifier information and the sum of the weights satisfies a pre-determined value.

11. The computer-implemented system of claim 10, wherein:

the designated-verifier information set specifies, for each designated verifier, a verifier account of the designated verifier;
the operations further comprise obtaining, from a blockchain of the blockchain system, the public key for each designated verifier using the verifier account for each designated verifier; and
determining that the transaction data is verified successfully when the authenticated information set comprises a pre-determined quantity of pieces of designated-verifier information comprises determining that the transaction data is verified successfully when a quantity of obtained public keys comprises a pre-determined quantity of public keys.

12. The computer-implemented system of claim 10, wherein:
the transaction data further comprises transaction initiator signature data specific to the plaintext transaction information, the transaction initiator signature data comprising a transaction initiator signature;
the operations further comprise verifying the transaction initiator signature data based on the plaintext transaction information and the transaction initiator signature data; and
determining that the transaction data is verified successfully comprises determining that the transaction data is verified successfully when the authenticated information set comprises a pre-determined quantity of pieces of designated-verifier information and the transaction initiator signature data is verified successfully.

13. The computer-implemented system of claim 12, wherein the transaction initiator signature data further comprises a transaction initiator public key, the operations further comprise verifying the transaction initiator signature using the transaction initiator public key and the plaintext transaction information.

14. The computer-implemented system of claim 12, wherein:
the plaintext transaction information comprises data specifying a transaction initiator account;
verifying the transaction initiator signature data based on the plaintext transaction information and the transaction initiator signature data comprises:
obtaining a transaction initiator public key in the blockchain system based on the transaction initiator account in the plaintext transaction information; and
verifying the transaction initiator signature using the transaction initiator public key and the plaintext transaction information.

* * * * *